(12) United States Patent
Ikegami et al.

(10) Patent No.: US 7,415,399 B2
(45) Date of Patent: Aug. 19, 2008

(54) DESIGN SUPPORT PROGRAM AND DESIGN SUPPORT METHOD

(75) Inventors: Hideyuki Ikegami, Abiko (JP); Akiko Kanno, Kashiwa (JP); Masahiro Serizawa, Toride (JP); Toru Ono, Moriya (JP); Akira Morisawa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 320 days.

(21) Appl. No.: 11/299,591

(22) Filed: Dec. 12, 2005

(65) Prior Publication Data

US 2006/0129364 A1    Jun. 15, 2006

(30) Foreign Application Priority Data

Dec. 14, 2004   (JP) .............................. 2004-361483

(51) Int. Cl.
*G06G 7/48*   (2006.01)
(52) U.S. Cl. ........................................................ 703/6
(58) Field of Classification Search .................. 399/76, 399/77, 81, 82, 631, 381, 388, 389; 358/1.1, 358/1.5, 1.13, 1.15; 703/6, 7, 13, 22
See application file for complete search history.

(56) References Cited

U.S. PATENT DOCUMENTS

| | | | |
|---|---|---|---|
| 4,035,072 A * | 7/1977 | Deetz et al. ..................... 399/11 |
| 5,113,251 A * | 5/1992 | Ichiyanagi et al. ........... 358/500 |
| 5,838,596 A * | 11/1998 | Shimomura et al. ............. 703/6 |
| 5,844,819 A | 12/1998 | Fujinuma |
| 6,717,693 B2 * | 4/2004 | Mitsuhashi et al. ......... 358/1.15 |
| 6,782,495 B2 * | 8/2004 | Bernklau-Halvor ........... 714/44 |
| 2002/0052723 A1 * | 5/2002 | Hashima et al. ................. 703/7 |
| 2002/0099634 A1 * | 7/2002 | Coutts et al. ................... 705/35 |

FOREIGN PATENT DOCUMENTS

| | | |
|---|---|---|
| JP | 5-143260 A | 6/1993 |
| JP | 9-081600 A | 3/1997 |
| JP | 2002-290685 A | 10/2002 |
| JP | 2002-335380 A | 11/2002 |

* cited by examiner

*Primary Examiner*—Paul L Rodriguez
*Assistant Examiner*—Andre Pierre Louis
(74) *Attorney, Agent, or Firm*—Canon U.S.A., Inc. I.P. Division

(57) ABSTRACT

A design support method capable of verifying correct processing operation of software for controlling a paper transport mechanism by using a computer includes a displaying step of displaying a simulation screen relating to transport of virtual paper on a display unit of the computer, a jam setting step of presetting a condition for causing a paper jam with respect to the virtual paper, a jam causing step of causing the paper jam in accordance with the condition preset in the jam setting step, a selecting step of, when the paper jam is caused by the jam causing step, selecting a sheet of virtual paper, the sheet being subjected to the paper jam, by an instruction from a user, and a deleting step of deleting the sheet of virtual paper selected by the selecting step from the simulation screen.

11 Claims, 22 Drawing Sheets

FIG. 13
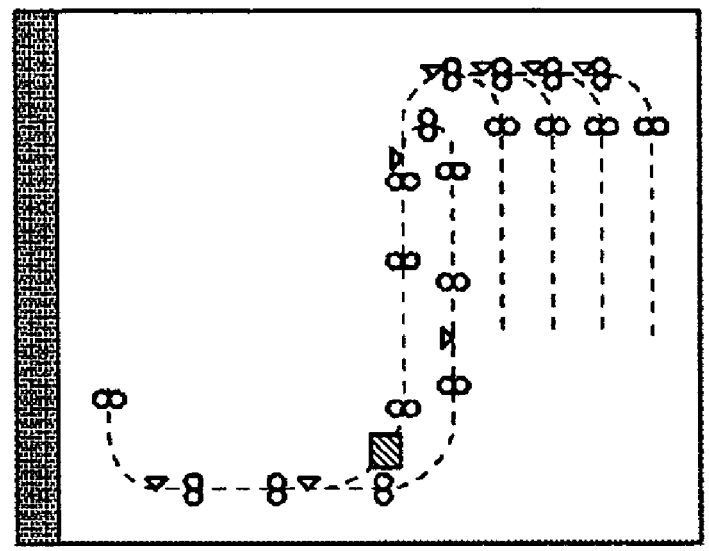
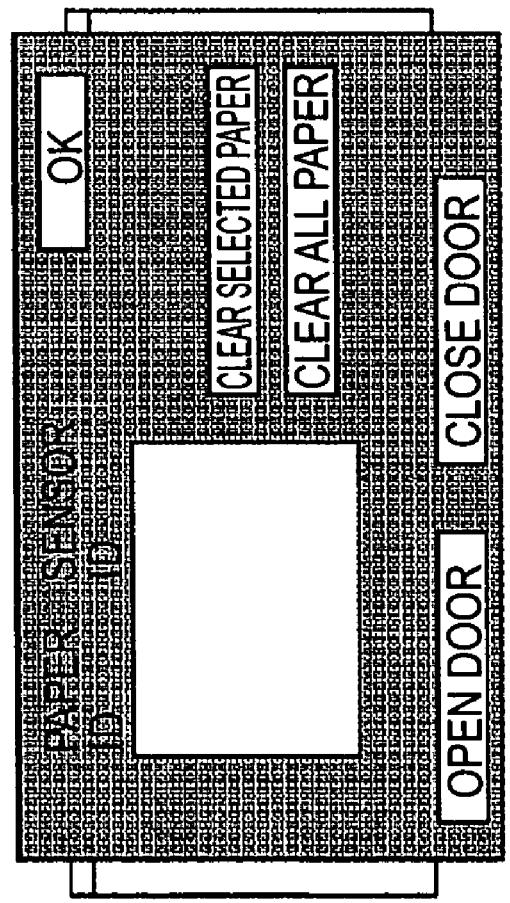

DESIGN SUPPORT PROGRAM AND DESIGN SUPPORT METHOD

BACKGROUND OF THE INVENTION

1. Field of the Invention

The present invention relates to a design support program and a design support method for supporting mechanism control. In particular, the present invention relates to a design support program and a design support method for software for controlling a transport mechanism for transporting a sheet of paper.

2. Description of the Related Art

Transporting sheet objects (i.e., hereinafter "paper") is performed in various machines and apparatuses. For example, image forming apparatuses, such as copiers and printers, transport sheets of paper by using transport mechanisms, such as rollers and guides.

Currently, transporting sheets of paper in only one direction at one speed is very rare. In most cases, the position of a sheet of paper is sensed by a sensor, the sheet of paper is stopped at a predetermined position, or the direction of transport is reversed by reversing the direction of rotation of rollers. Therefore, it is necessary to use software for controlling paper a transport mechanism.

As recent image forming apparatuses have enhanced functionality and productivity, software for controlling the image forming apparatuses have become more complicated, and the number of man-hours needed to find problems, track down the cause of the problems, and correct them has increased.

Under such circumstances, with improvement in performance of recent computers, designing paper transport mechanisms using a simulation technique has become more popular. For example, a system for finding potential failures by calculating the behavior of paper with a simulation has been proposed, as disclosed in Japanese Patent Laid-Open No. 9-081600 (corresponding to U.S. Pat. No. 5,844,819).

In addition to the increasing use of simulation techniques in various cases, a technique for verifying the correct operation of software for controlling a mechanism has also been proposed. For example, Japanese Patent Laid-Open No. 5-143260 discloses a design support method in which an external event, such as on/off operations of a switch, closing and opening of a cover, and the like, is caused by input from an input device (e.g., a keyboard).

However, conventional simulators for verifying the correct operation of software can simulate an abnormal status but do not have a function of recovering from the abnormal status to a normal status. In particular, conventional methods do not have an interface and a function of deleting a sheet of paper in a simulation when a paper jam is caused during paper transport, and therefore, they cannot return to the normal status and perform the next job.

For a simulator using a real machine, since recovery from the abnormal status is realized by an operation of a user, a function of returning to the normal status is not required. By contrast, for a simulator performing all tasks on a computer, this function is necessary because a returning sequence cannot be verified without it.

In printer control, failures tend to occur when a system recovers from the abnormal status, as well as those that occur when the abnormal status appears. Therefore, recovery from the abnormal status, especially, a paper jam status, is necessary for verification of the correct operation of software for controlling transport mechanism.

In some cases, paper tears and shreds of the paper are left behind while a system recovers from a paper jam. To address such cases, simulating recovery from the abnormal status should be performed. However, conventional design support methods cannot simulate such conditions.

SUMMARY OF THE INVENTION

The present invention provides a design support program and a design support method capable of verifying software for controlling transport mechanism in detail.

According to a first aspect of the present invention, a design support method capable of verifying correct processing operation of software for controlling a paper transport mechanism by using a computer includes a displaying step, a jam setting step, a jam causing step, a selecting step, and a deleting step. The displaying step displays a simulation screen relating to transport of virtual paper on a display unit of the computer. The jam setting step presets a condition for causing a paper jam with respect to the virtual paper. The jam causing step causes the paper jam in accordance with the condition preset in the jam setting step. The selecting step selects a sheet of virtual paper, the sheet being subjected to the paper jam, by an instruction from a user when the paper jam is caused by the jam causing step. The deleting step deletes the sheet of virtual paper selected by the selecting step from the simulation screen.

According to a second aspect of the present invention, a design support method capable of verifying correct processing operation of software for controlling a paper transport mechanism by using a computer includes a displaying step, an inputting step, and a creating step. The displaying step displays a simulation screen relating to transport of virtual paper on a display unit of the computer. The inputting step inputs any place on the simulation screen by an instruction from a user. The creating step creates a sheet of virtual paper at the place input in the inputting step on the simulation screen.

According to a third aspect of the present invention, a design support method capable of verifying correct processing operation of software for controlling a paper transport mechanism by using a computer includes a displaying step, a jam setting step, a jam causing step, a selecting step, and a deleting step. The displaying step displays a simulation screen relating to transport of virtual paper on a display unit of the computer. The jam setting step presets a condition for causing a paper jam with respect to the virtual paper. The jam causing step causes the paper jam in accordance with the condition preset in the jam setting step. The selecting step selects a sheet of virtual paper, the sheet being subjected to the paper jam, by an instruction from a user when the paper jam is caused by the jam causing step. The deleting step deletes from the simulation screen a portion of the sheet, the portion being sensed by the virtual sensor selected in the selecting step.

Further features of the present invention will become apparent from the following description of exemplary embodiments with reference to the attached drawings.

BRIEF DESCRIPTION OF THE DRAWINGS

FIG. 13 is an illustration for explaining an exemplary screen for paper clearance settings according to the first exemplary embodiment.

DESCRIPTION OF THE EMBODIMENTS

A design support apparatus according to various exemplary embodiments, features and aspects is now herein described below with reference to the drawings.

First Exemplary Embodiment

According to this exemplary embodiment, when a paper jam is caused in a simulation for a paper transport mechanism (hereinafter referred to as paper transport simulation), a sheet of virtual paper subjected to the paper jam is deleted from a simulation screen by an instruction from a user, and the status of a virtual sensor that senses the jammed sheet is cleared. In this specification, the term "virtual" is used to describe imaginary paper and sensors created in simulation.

[Exemplary Design Support Apparatus]

Figure 1:
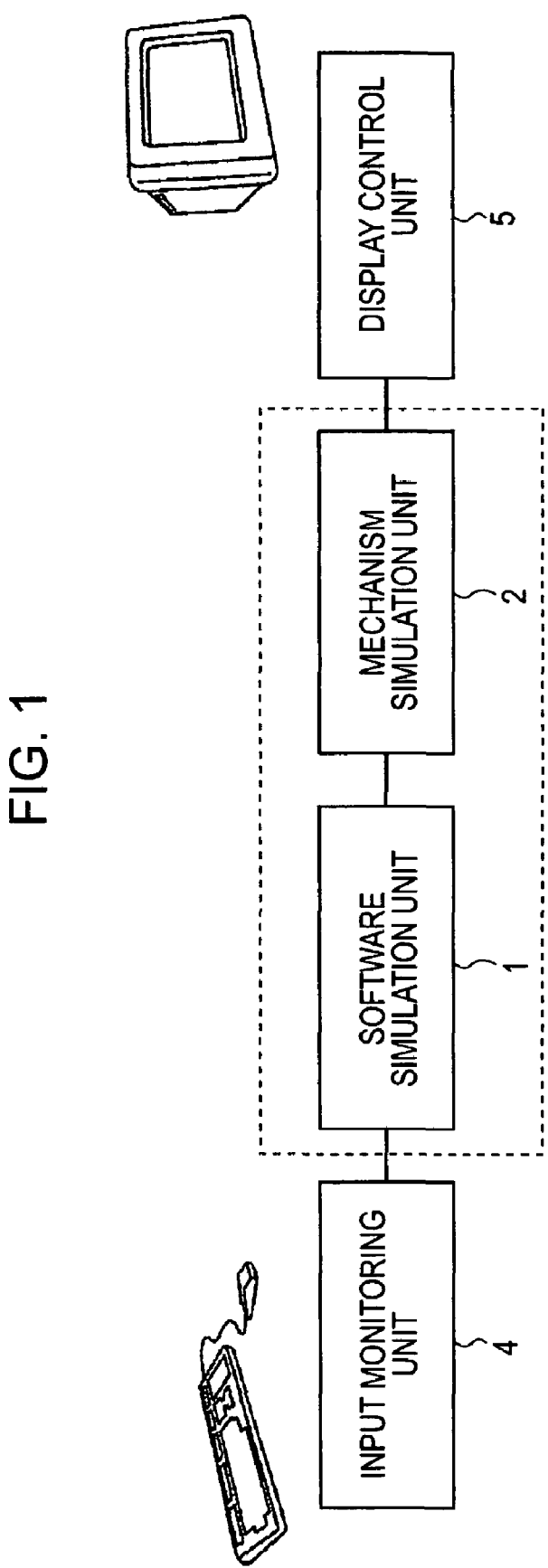
FIG. 1 is a block diagram of an exemplary design support apparatus.

FIG. 1 illustrates a design support apparatus according to the first exemplary embodiment. The design support apparatus is a paper transport simulator capable of running a paper transport simulation for an image forming apparatus on a personal computer. The design support apparatus is capable of supporting a design of timing control in firm software for controlling a real image forming apparatus and verifying correct processing operations in the firm software.

The design support apparatus according to the first exemplary embodiment includes a software simulation unit 1, a mechanism simulation unit 2, an input monitoring unit 4, and a display controlling unit 5. These components are stored on a hard disk drive (HDD) in the personal computer and executed on a central processing unit (CPU). For the execution thereof, they are stored in a random-access memory (RAM) in the personal computer and then executed.

The software simulation unit 1 is used for executing software relating to paper transport control in the CPU in the personal computer in a virtual sense. The input monitoring unit 4 functions to monitor input from a man machine interface (e.g., a keyboard and a mouse) and provide the software simulation unit 1 with an instruction to begin to execute the software simulation.

The result of the software simulation is sent to the mechanism simulation unit 2. The mechanism simulation unit 2 determines where a sheet of virtual paper is present within the paper transport mechanism from the calculation based on the speed of virtual rollers relating to paper transport control and the like and sends the result to the software simulation unit 1 or the display controlling unit 5.

Figure 2:
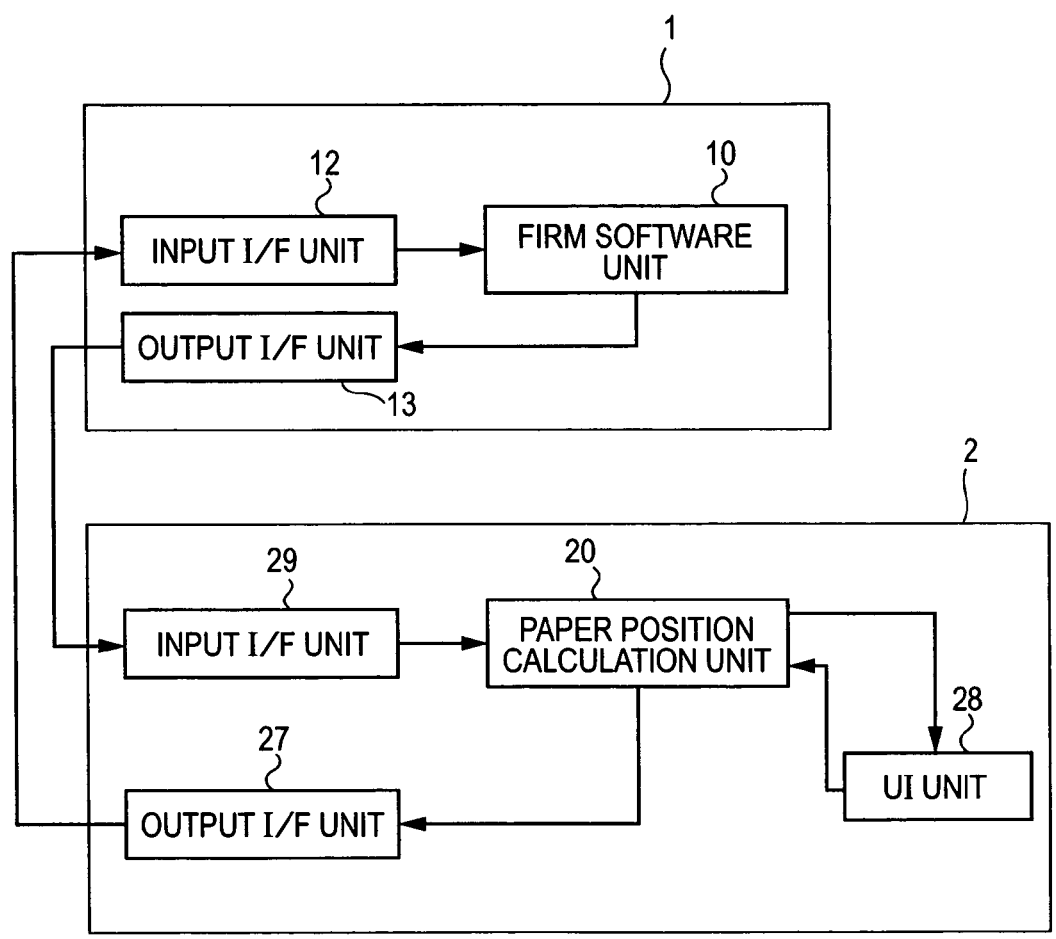
FIG. 2 is an exemplary detailed block diagram of the design support apparatus.

FIG. 2 illustrates the software simulation unit 1 and the mechanism simulation unit 2 in the design support apparatus according to this exemplary embodiment. The software simulation unit 1 includes a firm software unit 10, an input interface (I/F) 12, and an output I/F 13. The firm software unit 10 is software for controlling paper transport in a real image forming apparatus. The input I/F 12 is used for receiving information from the mechanism simulation unit 2. The output I/F 13 is used for outputting information to the mechanism simulation unit 2.

The mechanism simulation unit 2 includes a paper-position calculating unit 20, an input I/F 29, an output I/F 27, and a paper-position displaying (UI) unit 28. The input I/F 29 is used for receiving the result output from the output I/F 13 in the software simulation unit 1 and for passing to a subsequent stage information regarding control of various devices, such as a virtual motor, a virtual clutch, a virtual flapper, and the like, relating to paper transport control.

The paper-position calculating unit 20 calculates the transport speed in a paper transport path on the basis of the information regarding control of the virtual motor, virtual clutch, and virtual flapper relating to paper transport, calculates the positions of the leading and trailing ends of a sheet of virtual paper, and stores them.

Figure 3:
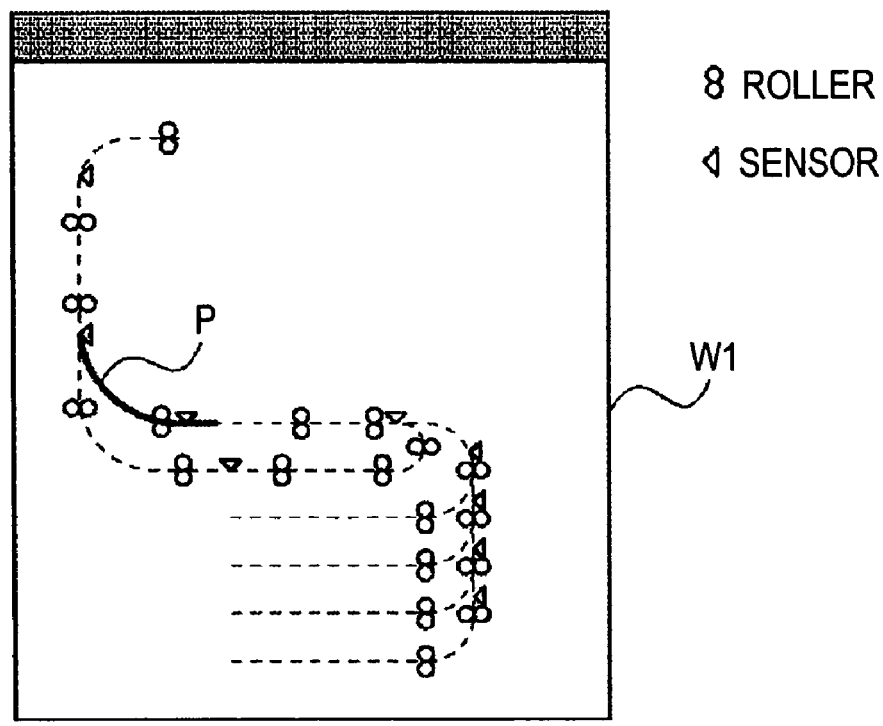
FIG. 3 illustrates an example of a displayed screen in the design support apparatus.

The paper-position displaying (UI) unit 28 functions to provide the display controlling unit 5 with an instruction to display a screen W1 in the paper transport simulation shown in FIG. 3 on the basis of the positions of the leading and trailing ends of the sheet of virtual paper calculated by the paper-position calculating unit 20, which is in front of the paper-position displaying (UI) unit 28.

The output I/F 27 functions to provide the input I/F 12 in the software simulation unit 1 with information regarding the position of paper set by the paper-position calculating unit 20, which is in front of the output I/F 27.

[Exemplary Paper Transport Display Features and Aspects]

FIG. 3 illustrates an example of the screen W1 in a paper transport simulation displayed on a display of the personal computer by the display controlling unit 5. In the screen W1 in the paper transport simulation, paths of transporting virtual paper are represented by the dotted lines, virtual rollers are represented by the circles, virtual sensors are represented by the triangles, and a sheet of virtual paper P is represented by the solid line.

Figure 4:
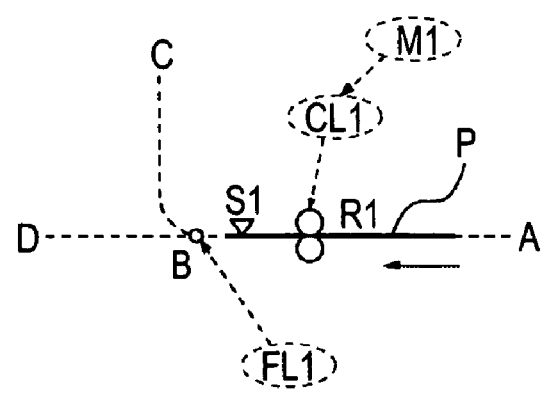
FIG. 4 is an illustration for explaining an exemplary transport simulation.

Next, actual exemplary operations in simulation are described with reference to FIG. 4 which illustrates an example of an arrangement of devices relating to paper transport control. In the exemplary simulation shown in FIG. 4, the virtual paper P is transported in the direction of the solid arrow along a virtual path AB by a virtual roller set R1 driven by a virtual motor M1 via a virtual clutch CL1, and at the time when the leading end of the virtual paper P has passed through a virtual sensor S1, a virtual flapper FL1 is switched to transport the virtual paper P along a virtual path BC or a virtual path BD. The arrows indicated by the dotted lines represent the relationship in driving.

When a designer provides an instruction to begin a paper transport simulation from a man machine interface, the software simulation unit 1 and the mechanism simulation unit 2 are executed via the input monitoring unit 4. When the software simulation unit 1 begins, the firm software unit 10 executes software programs for controlling paper transport in the real image forming apparatus successively.

When the virtual motor M1 begins to rotate in the firm software unit 10, the ID number identifying the virtual motor M1, the speed of rotation, and the direction of rotation are provided in the form of a command to the input I/F 29 in the mechanism simulation unit 2 via the output I/F 13. The input I/F 29 then sends the commands to the paper-position calculating unit 20.

The paper-position calculating unit 20 begins to rotate the virtual motor M1, searches for a virtual roller set and a virtual clutch that are driven by the virtual motor M1, and calculates the speed of rotation and the direction of rotation. For the virtual roller set R1, it is driven via the virtual clutch CL1. Therefore, the speed of rotation and the direction of rotation of the virtual roller set R1 are calculated on the basis of information regarding the on/off states of the virtual clutch CL1.

The paper-position calculating unit 20 calculates the positions of the leading and trailing ends of the virtual paper P at predetermined intervals t. The paper-position calculating unit 20 first acquires information regarding the virtual path AB in which the virtual paper P is contained from its leading end to its trailing end. The information regarding each path includes information regarding the ID and the position of a virtual roller set in each virtual path. The paper-position calculating unit 20 searches for a virtual roller set in the direction from the leading end to the trailing end of the virtual paper P, and acquires a speed v corresponding to the ID of the virtual roller set R1, which is found first.

Information regarding the position of the virtual paper P is updated by determining the distance ($S = v \times t$) traveled by the virtual paper P for the interval t on the basis of the speed v and the interval t. The updated information regarding the position is sent to the paper-position displaying (UI) unit 28 and displayed on the screen W1 in paper transport simulation.

The information regarding the path contains the ID and the position of a virtual sensor in each virtual path. The paper-position calculating unit 20 searches for a virtual sensor in the direction from the leading end to the trailing end of the virtual paper P, and sends information regarding the on state of the found virtual sensor S1 to the output I/F 27. When the trailing end of the virtual paper P has passed through the virtual sensor S1, information regarding the off state of the virtual sensor S1 is sent to the output I/F 27.

The output I/F 27 converts the information regarding the on/off state of the virtual sensor S1 into a command and outputs the command to the input I/F 12 in the software simulation unit 1.

The firm software unit 10 receives the information regarding the on state of the virtual sensor S1 from the input I/F 12 and begins to control the virtual flapper FL1. Sending commands to the mechanism simulation unit 2 in this case is similar to that of sending commands to the mechanism simulation unit 2 in the case of the virtual motor M1. Upon receipt of a control command of the virtual flapper FL1, when the leading end of the virtual paper P reaches a branch point B, the paper-position calculating unit 20 determines a virtual path where the virtual paper P is to be transported and determines whether the virtual path for the virtual paper P is the virtual path BC or the virtual path BD, depending on the state in which the virtual flapper FL1 is switched.

Figure 5:
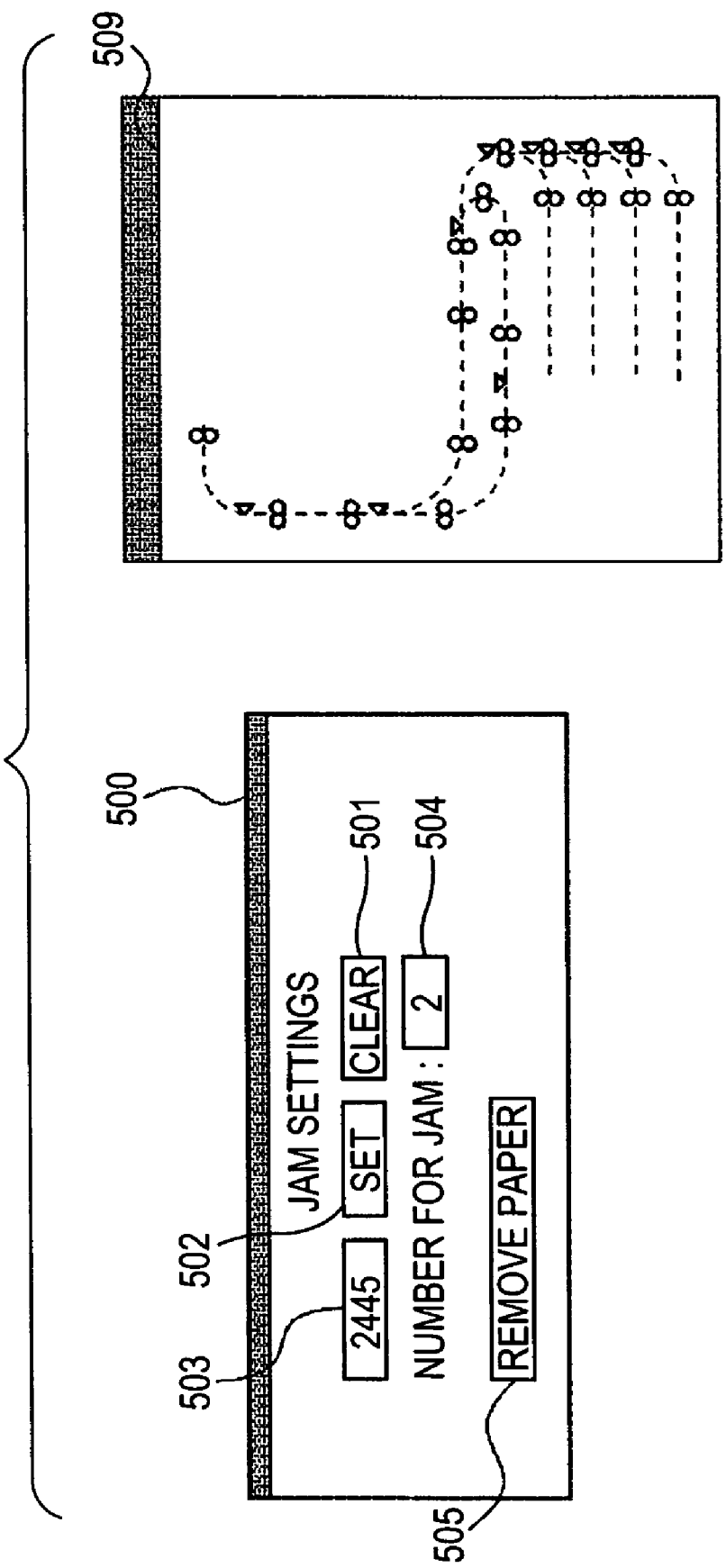
FIG. 5 is an illustration for explaining an exemplary screen for jam settings.

A function of causing a paper jam according to this exemplary embodiment is described with reference to FIG. 5. FIG. 5 shows an exemplary screen that appears before a simulation begins. A paper jam setting screen 500 is used for setting the place where a paper jam is to be caused. A paper transport display screen 509 displays how a sheet of virtual paper is transported. Since FIG. 5 shows a state that occurs before virtual paper is transported, only the virtual transport path is displayed on the paper transport display screen 509.

A paper-jam place setting area 503 is an area in which a user sets the place where the user wants to cause a paper jam. If the function of causing a paper jam is used, a sheet of virtual paper stops at this set place. The exemplary units used in the paper-jam place setting area 503 are millimeters (mm). The user enters a numerical value as a distance from a fiducial point in this area. Instead of entering a numerical value, a place where the user wants to cause a paper jam may be set by directly pointing to the place on a screen using, for example, a pointing device.

A paper-jam number setting area 504 is an area in which a user sets the number of sheets of virtual paper. When the set number of sheets has passed through the set place where the paper jam is to be caused, the sheet of virtual paper is stopped. In other words, the value input to the paper-jam number setting area 504 is information indicating the number of sheets of virtual paper allowed to be counted before the paper jam is caused.

The settings set in the paper-jam place setting area 503 and the paper-jam number setting area 504 are made effective by the pressing of a set button 502. A paper removal button 505 is a button that is pressed to remove a sheet of virtual paper remaining in a printer unit. Processing that occurs after the paper removal button 505 is pressed is described later. Additionally, a clear button 501 is provided to clear the jam settings.

An exemplary screen that appears after the set button 502 shown in FIG. 5 is pressed is described with reference to FIG. 6. In order to illustrate that the jam settings based on the place set in the paper-jam place setting area 503 in FIG. 5 are made, a mark 510 indicating that the jam settings have been made is set in the paper transport display screen in FIG. 6. This enables a user to readily find where a paper jam is to be caused.

Figure 6:
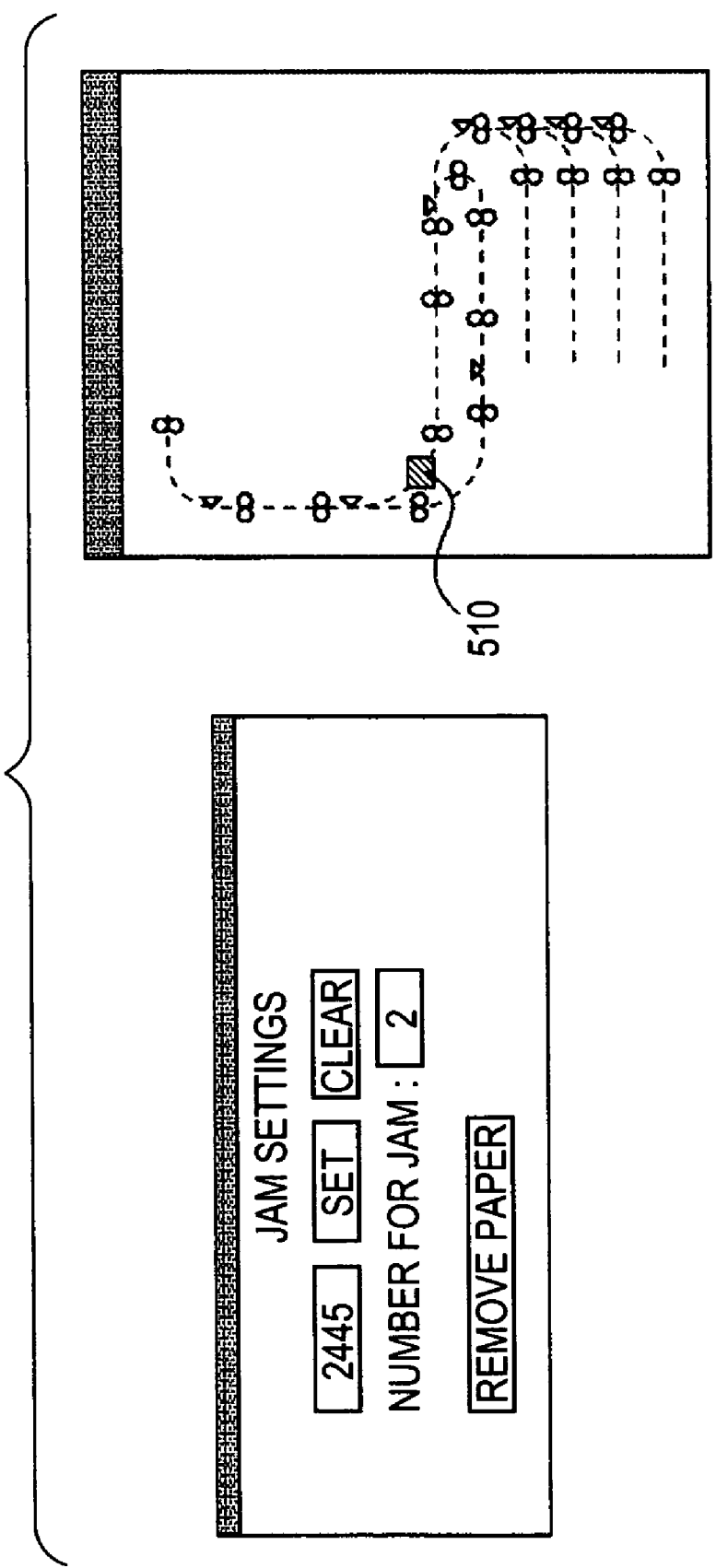
FIG. 6 is an illustration for explaining an exemplary screen for jam settings.
Figure 7:
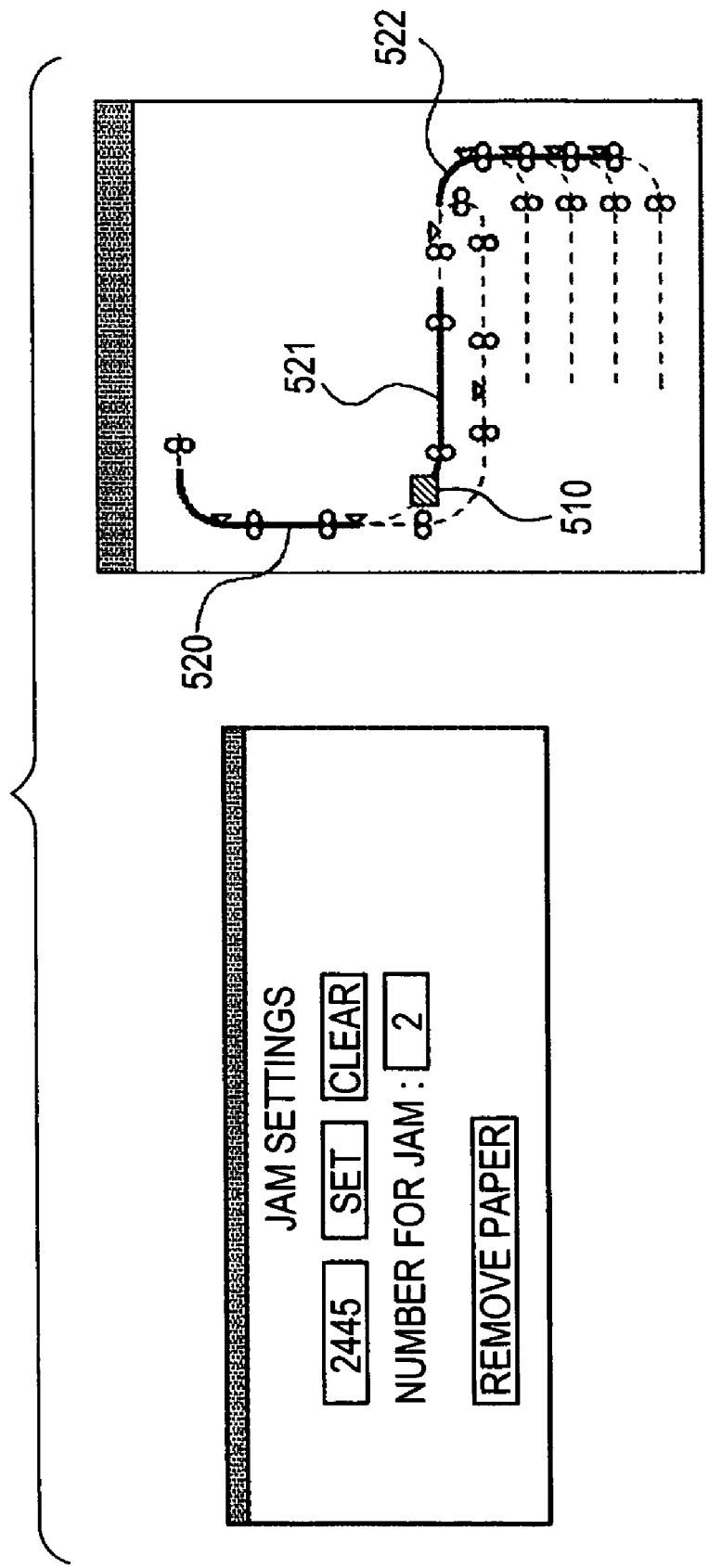
FIG. 7 is an illustration for explaining an exemplary screen for jam settings.

FIG. 7 illustrates an exemplary screen that appears after a job begins in the state shown in FIG. 6. Reference numerals 520, 521, and 522 represent a first sheet, a second sheet, and a third sheet of virtual paper, respectively. Since a number of "2" is set in the paper-jam number setting area 504 in FIG. 5, FIG. 7 shows a state that stops when the first sheet of virtual paper 520 has passed through the mark 510 and the second sheet of virtual paper 521 is approaching the mark 510.

[Exemplary Process Flow of a Screen Module]

Processing that occurs on the basis of information input to the screen shown in FIG. 5 is described with reference to the flowchart of FIG. 8 which depicts an exemplary process flow of a screen module. This process flow is contained in the processing that is carried out in the paper-position displaying (UI) unit 28 shown in FIG. 2.

First, in step S601, it is determined whether the set button 502 has been pressed. If, in step S601, it is determined that the set button 502 has been pressed, processing proceeds to step S602. In step S602, the paper-position displaying (UI) unit 28 notifies the paper-position calculating unit 20 that the jam settings have been made. At the same time, the paper-position calculating unit 20 is notified of position information set in the paper-jam place setting area 503 and number information set in the paper-jam number setting area 504 shown in FIG. 5. Processing then returns to step S601.

If, in step S601, it is determined that the set button 502 has not been pressed, processing proceeds to step S603. In step S603, it is determined whether the clear button 501 has been pressed (from FIG. 5). If, in step S603, it is determined that the clear button 501 has been pressed, processing proceeds to step S604. In step S604, the paper-position calculating unit 20 is notified that the jam settings have been cleared, and processing returns to step S601. If, in step S603, it is determined that the clear button 501 has not been pressed, processing returns to step S601, and the steps are repeated.

[Exemplary Transport Control Processing]

Figure 9:
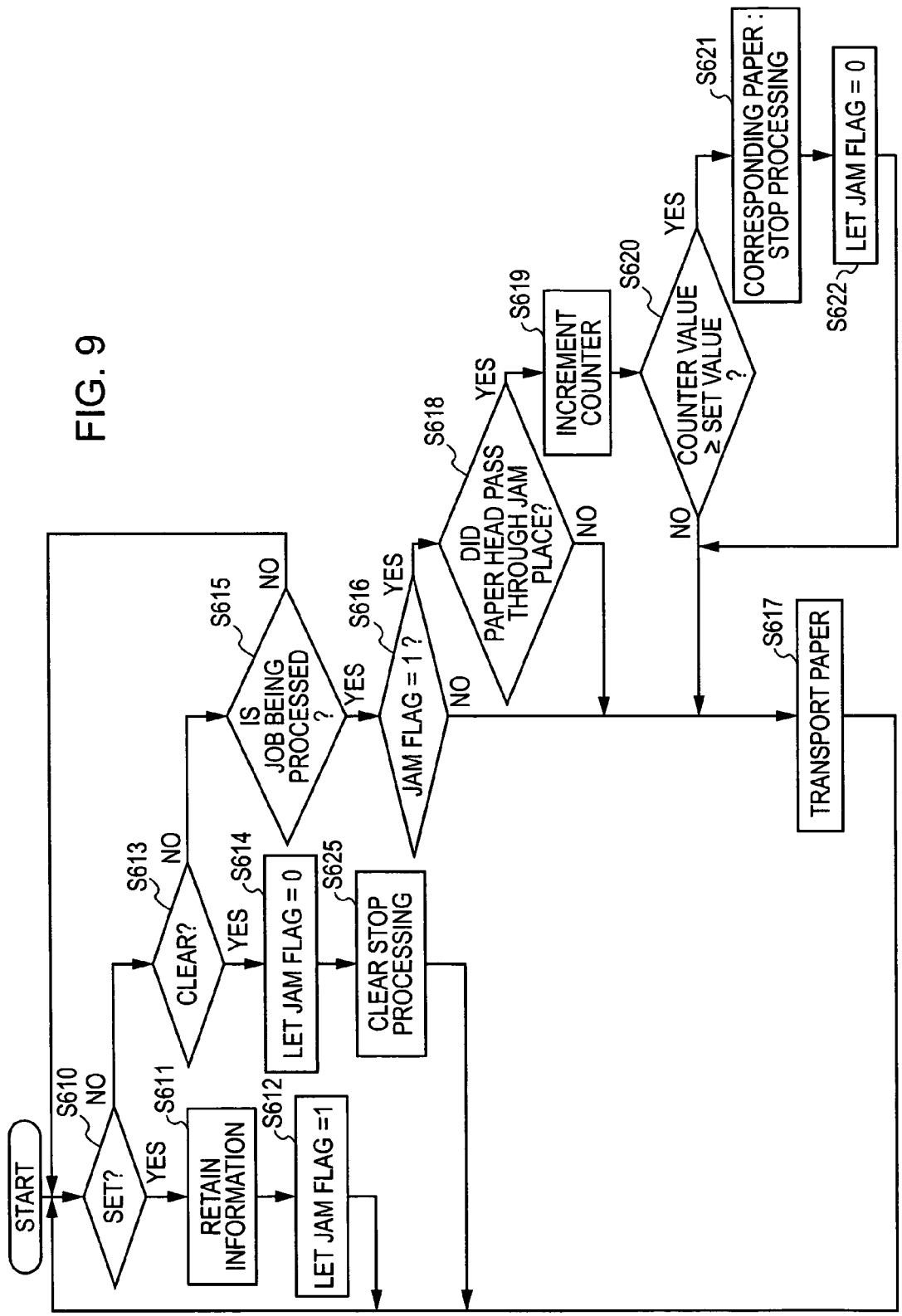
FIG. 9 is a flowchart of an exemplary process flow of a paper-position calculating unit in jam settings.

Paper transport control processing that occurs on the basis of information input to the screen shown in FIG. 5 is described with reference to the flowchart of FIG. 9 which depicts exemplary processing of paper transport control that is carried out in the paper-position calculating unit 20 shown in FIG. 2. The processing described below allows a paper jam to be caused at any place in the exemplary embodiment.

Figure 8:
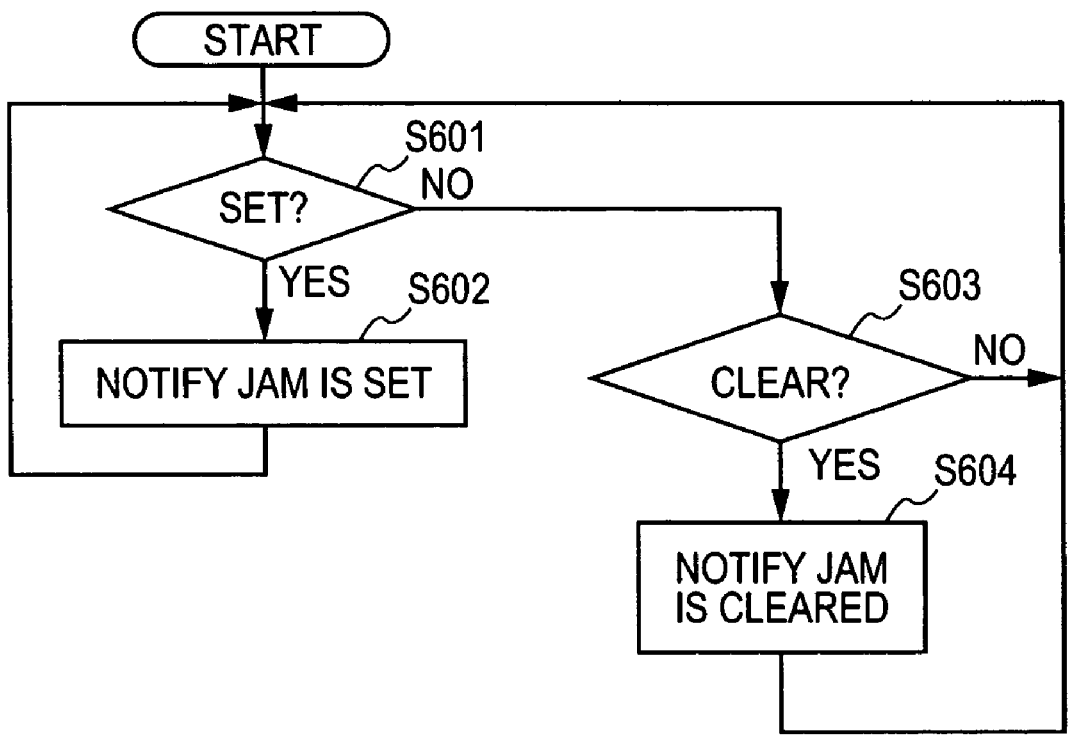
FIG. 8 is a flowchart of an exemplary process flow of a user interface (UI) unit in jam settings.

First, in step S610, it is determined whether the paper-position calculating unit 20 has received from the paper-position displaying (UI) unit 28 a notification that the jam settings have been made, which is shown in step S602 in FIG. 8. If, in step S610, it is determined that the paper-position calculating unit 20 has received the notification, processing proceeds to step S611. In step S611, sent information is retained. In particular, information regarding the place where a paper jam is to be caused and information regarding the number of sheets of virtual paper allowed to be counted before the paper jam is caused are retained.

When step S611 ends, processing then proceeds to step S612 which substitutes one into a jam flag. The jam flag is used when it is determined whether the occurrence of a paper jam is monitored, which is described later. When step S612 ends, processing then returns to step S610.

If, in step S610, it is determined that the paper-position calculating unit 20 has not received the notification, processing proceeds to step S613. In step S613, it is determined whether the paper-position calculating unit 20 has received a notification that the paper jam is to be cleared. If, in step S613, it is determined that the paper-position calculating unit 20 has received the notification, processing proceeds to step S614. In step S614, the jam flag is cleared to zero, and processing proceeds to step S625. In step S625, if a sheet of virtual paper that is subjected to stop processing performed in step S621, which is described later, is present, the stop processing is cleared, and processing returns to step S610.

If, in step S613, it is determined that the paper-position calculating unit 20 has not received the notification, processing proceeds to step S615. In step S615, it is determined whether a job is being performed in the current status. If, in step S615, it is determined that the job is not being performed, processing returns to step S610.

If, in step S615, it is determined that the job is being performed, processing proceeds to step S616. In step S616, it is determined whether the jam flag is one. If, in step S616, it is determined that the jam flag is zero, processing proceeds to step S617. In step S617, each sheet of virtual paper is transported, and processing then returns to step S610.

If, in step S616, the jam flag is one, processing proceeds to step S618. In step S618, it is determined whether the current status is a situation that is present immediately after the leading end of a sheet of virtual paper has passed through the place where a paper jam is to be caused which is indicated by the information retained in step S611. This determination is performed on all sheets of virtual paper which are present. The situation that is present immediately after the leading end of a sheet of virtual paper has passed through the place where a paper jam is to be caused is determined on the basis of a decision in which the current determination is that the leading end is positioned beyond the place where the paper jam is to be caused, whereas the previous determination is that the leading end is positioned before the place where the paper jam is to be caused.

If, in step S618, it is determined that the current status is not the situation that is present immediately after the leading end has passed through the place where the paper jam is to be caused, processing proceeds to step S617. In step S617, each sheet of virtual paper is transported, and processing then returns to step S610. If, in step S618, it is determined that the current status is the situation that is present immediately after the leading end has passed through the place where the paper jam is to be caused, processing proceeds to step S619, where a counter is incremented. The counter value is cleared when a job is started (the detailed explanation is omitted). If, in step S618, it is determined that the paper head did not pass through the jam place, then processing proceeds to step S617.

Then, in step S620, it is determined whether the counter value is equal to or larger than the number (referred to as set value) retained in step S611. If it is determined that the counter value is smaller than the set value, processing proceeds to step S617. In step S617, each sheet of virtual paper is transported, and processing then returns to step S610.

If, in step S620, it is determined that the counter value is equal to or larger than the set value, processing proceeds to step S621, where stop processing is performed on a corresponding sheet of virtual paper. This stop processing performed on the corresponding sheet of virtual paper is a process in which only a sheet of virtual paper that is passing through the place where the paper jam is to be caused at that point is stopped even when processing proceeds to step S617 which transports a sheet of virtual paper. Therefore, the corresponding sheet of virtual paper is not transported when a virtual roller set in contact with the corresponding sheet of virtual paper is rotated. When step S621 ends, processing then proceeds to step S622 which clears the jam flag to zero. Then, in step 617, each virtual paper is transported, and processing returns to step S610. Further, if in step S618, it is determined that the counter value is less than the set value, then processing proceeds to step S617.

[Exemplary Removal Processing]

Exemplary removal processing of virtual paper in a simulation is now described with reference to FIGS. 10 to 15. Here, clearing virtual paper is the simulated operation of removing a jammed sheet of paper, which would be removed from a real machine by a user when, for example, a paper jam occurs.

Figure 10:
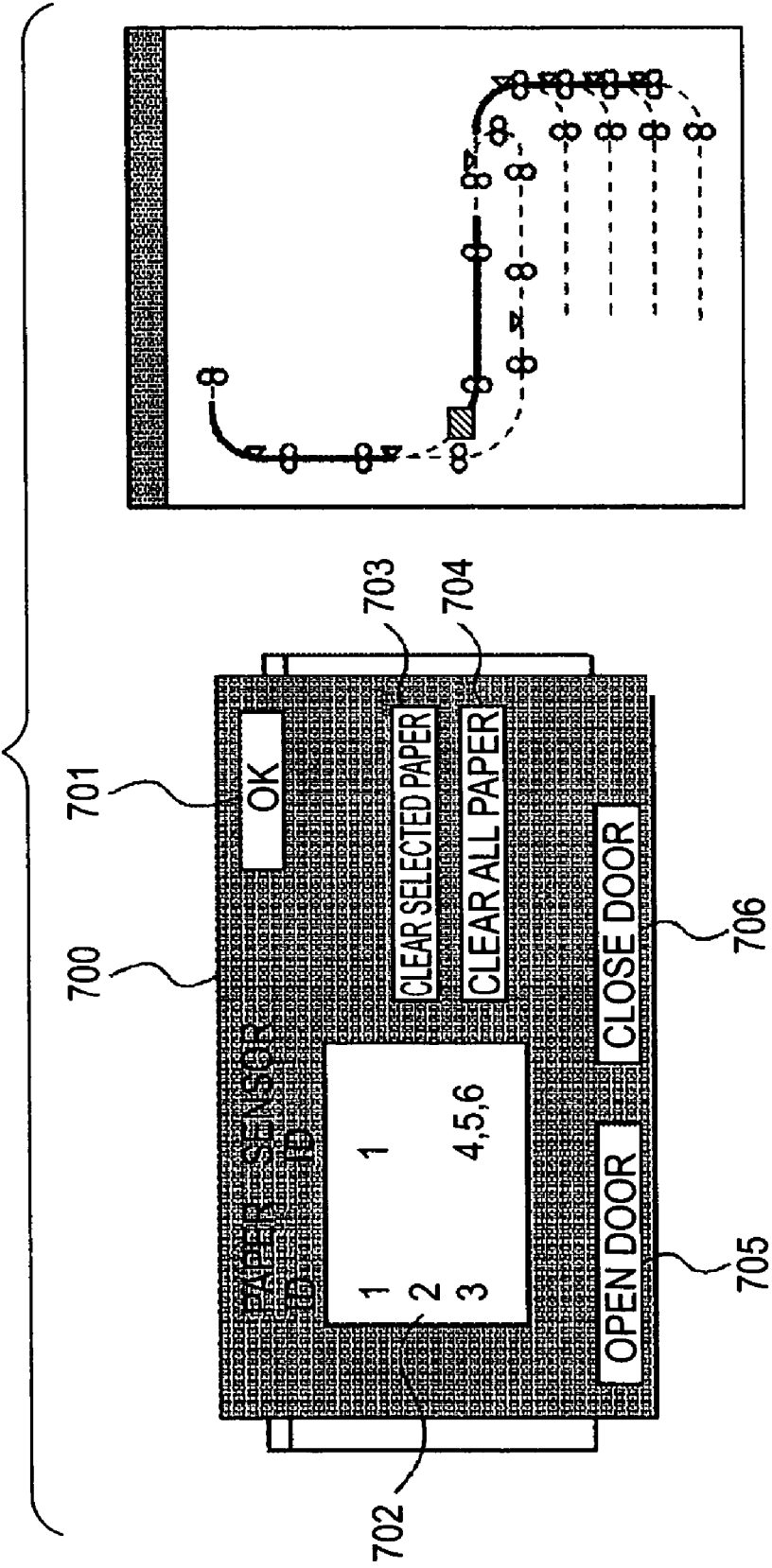
FIG. 10 is an illustration for explaining an exemplary screen for paper clearance settings according to a first exemplary embodiment.

FIG. 10 illustrates an exemplary screen that appears after the paper removal button 505 is pressed in the screen shown in FIG. 7. A paper removal setting screen 700 is configured to be closed by the pressing of an OK button 701. A paper-information display screen 702 displays paper IDs for sheets of virtual paper that are currently simulated and sensor IDs of virtual sensors in contact with the sheets of virtual paper. If a selected-paper clearing button 703 is pressed, a selected sheet of virtual paper is cleared from the paper-information display screen 702.

If an all paper clearing button 704 is pressed, all sheets of virtual paper currently simulated are cleared. When virtual paper is cleared, the status of each of the virtual sensors corresponding to the displayed sensor IDs is fed back to the firm software unit 10 via the output I/F 27 and the input I/F 12 shown in FIG. 2. If a door open button 705 or a door close button 706 is pressed, information regarding an I/F corresponding to a door is fed back to the firm software unit 10 via the output I/F 27 and the input I/F 12 shown in FIG. 2.

Next, an exemplary screen that appears when a sheet of virtual paper is cleared is described with reference to FIG. 11 which illustrates a screen that appears after a sheet of virtual paper that has paper ID number 1 is selected in the screen shown in FIG. 10. When a user clicks on the paper ID in the screen shown in FIG. 10, the pixels of the area of the paper ID are inverted (to white-on-black), as indicated with a reference numeral 801, and the paper ID is selected. When the user presses a selected-paper clearing button 803 in this state, a screen shown in FIG. 12 appears. If an all paper clearing button 804 is pressed, all sheets of virtual paper currently simulated are cleared.

Figure 11:
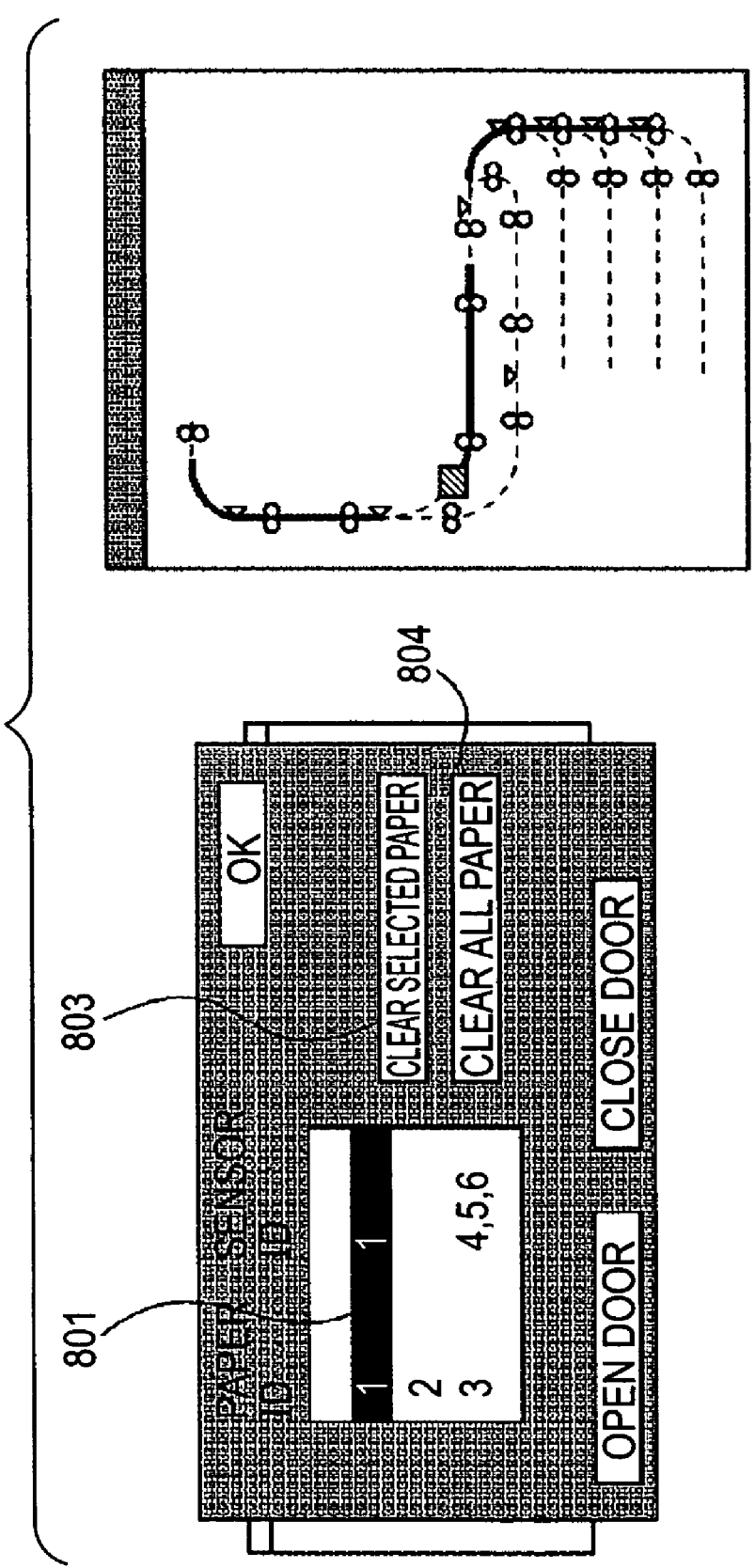
FIG. 11 is an illustration for explaining an exemplary screen for paper clearance settings according to the first exemplary embodiment.
Figure 12:
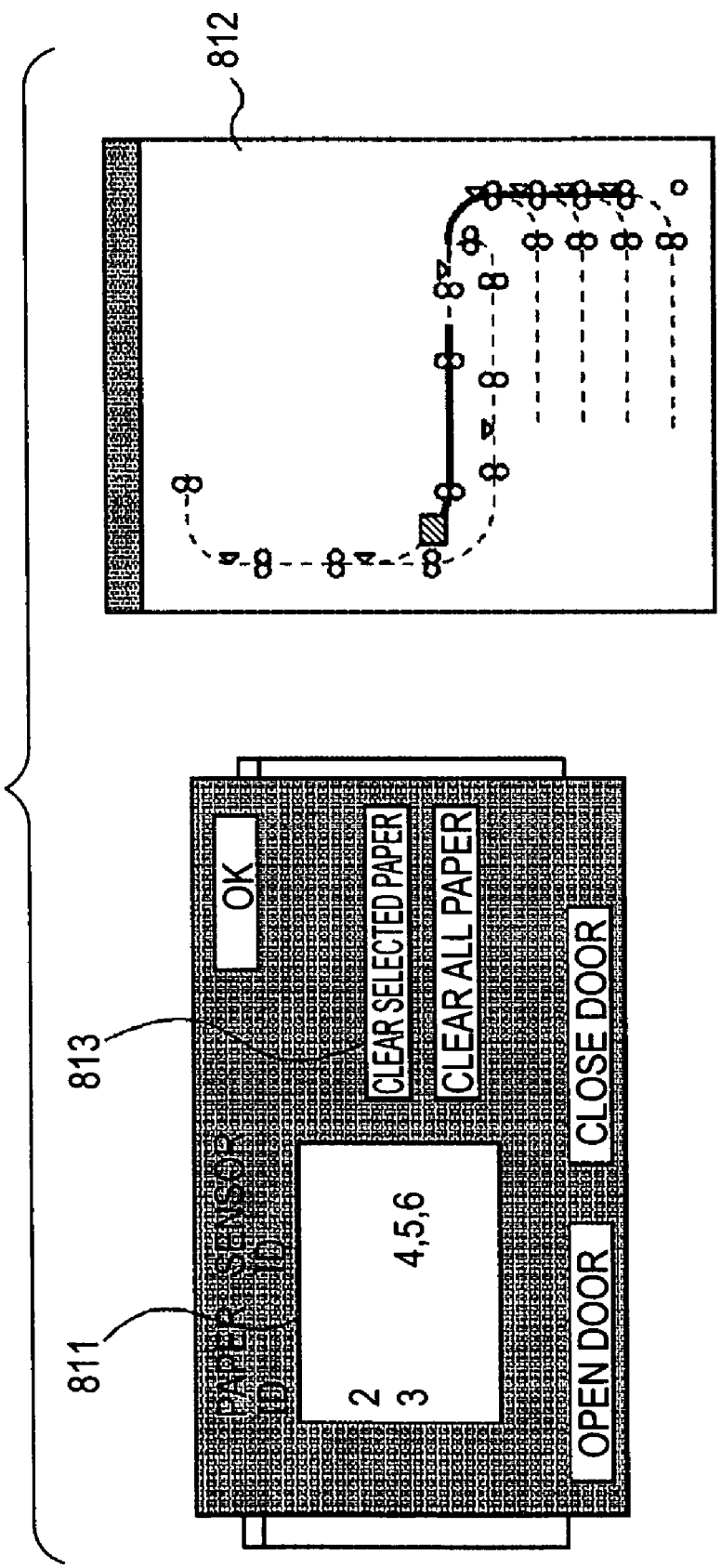
FIG. 12 is an illustration for explaining an exemplary screen for paper clearance settings according to the first exemplary embodiment.

FIG. 12 illustrates an exemplary screen in which a sheet of virtual paper selected in FIG. 11 is deleted from a list, as shown in a paper-information display screen 811, and the sheet of virtual paper is deleted from a paper transport display screen 812. When the virtual paper is cleared, the value of a corresponding virtual sensor (in this case, sensor ID Number 1) is fed back to the firm software unit 10, as in the case described above.

FIG. 13 illustrates an exemplary screen that appears after paper ID number 2 and paper ID number 3 are selected in the same manner and then a selected-paper clearing button 813 is pressed with respect to the selection of each of the paper ID number 2 and the paper ID number 3 in the state shown in FIG. 12. The screen shown in FIG. 13 also appears after an all-paper clearing button 804 is pressed in the state shown in FIG. 11.

Next, exemplary paper clearing processing is described with reference to the flowchart shown in FIG. 14 which is a flowchart of paper clearing processing in the paper-position displaying (UI) unit 28. First, in step S901, it is determined whether a selected-paper clearing button (the selected-paper clearing button 803 shown in FIG. 11) has been pressed. If it is determined that the selected-paper clearing button has been pressed, processing proceeds to step S902. In step S902, the paper-position displaying (UI) unit 28 notifies the paper-position calculating unit 20 that the selected paper is to be cleared. At this time, together with this notification, information indicating what sheet of virtual paper had been selected in the paper-information display screen 702 is notified. The selection of the sheet of virtual paper is performed by specifying its paper ID. When step S902 ends, processing then returns to step S901.

If, in step S901, it is determined that the selected-paper clearing button has not been pressed, processing proceeds to step S903. In step S903, it is determined whether an all paper clearing button (the all paper clearing button 704 shown in FIG. 10) has been pressed. If, in step S903, it is determined that the all paper clearing button has been pressed, processing proceeds to step S904 where, the paper-position displaying (UI) unit 28 notifies the paper-position calculating unit 20 that all sheets of paper are to be cleared. Processing then returns to step S901.

If, in step S903, it is determined that the all paper clearing button has not been pressed, processing proceeds to step S905. In step S905, it is determined whether a door open button (the door open button 705 shown in FIG. 10) has been pressed. If, in step S905, it is determined that the door open button has been pressed, processing proceeds to step S906, where the paper-position displaying (UI) unit 28 notifies the paper-position calculating unit 20 that the door is to be open. Then, processing then returns to step S901.

If, in step S905, it is determined that the door open button has not been pressed, processing proceeds to step S907. In step S907, it is determined whether a door close button (the door close button 706 shown in FIG. 10) has been pressed. If, in step S907, it is determined that the door close button has been pressed, processing proceeds to step S908. In step S908, the paper-position displaying (UI) unit 28 notifies the paper-position calculating unit 20 that the door is to be closed, and processing then returns to step S901. If, in step S907, it is determined that the door close button has not been pressed, processing returns to step S901.

Figure 15:
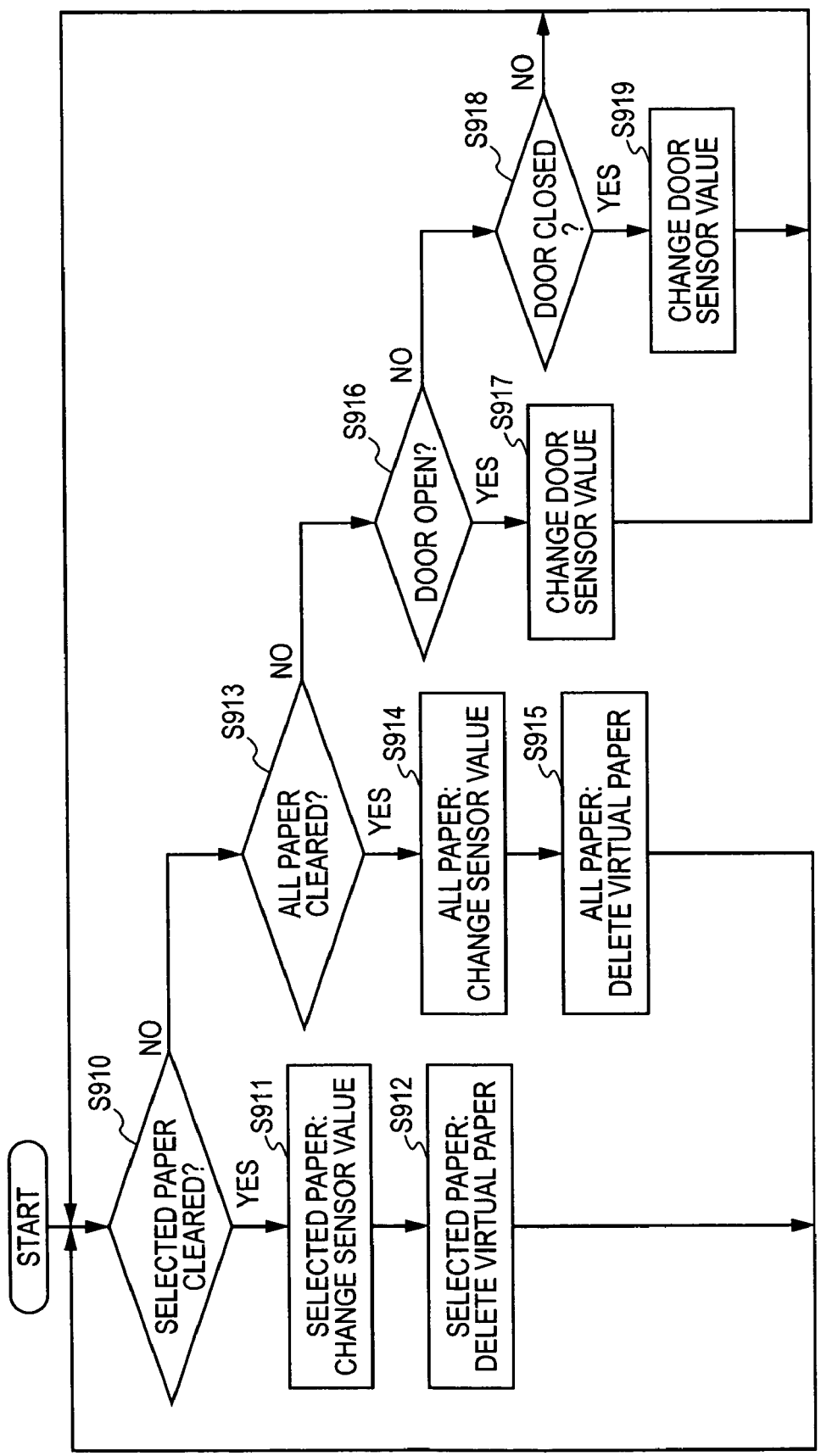
FIG. 15 is a flowchart of an exemplary process flow of the paper-position calculating unit during paper clearance according to the first exemplary embodiment.

Next, exemplary processing relating to paper clearing processing in the paper-position calculating unit 20 is described with reference to FIG. 15. This processing is carried out in parallel with paper transport processing. In step S910, it is determined whether the paper-position calculating unit 20 has received from the paper-position displaying (UI) unit 28 a notification that the selected sheet of virtual paper is to be cleared. If, in step S910, it is determined that the paper-position calculating unit 20 has received the notification, processing proceeds to step S911. In step S911, the value of a virtual sensor corresponding to the selected sheet is changed. In other words, with respect to the corresponding virtual sensor, a status that senses virtual paper is changed to a status that senses no virtual paper. This change is fed back to the firm software unit 10 via the output I/F 27 and the input I/F 12.

Figure 14:
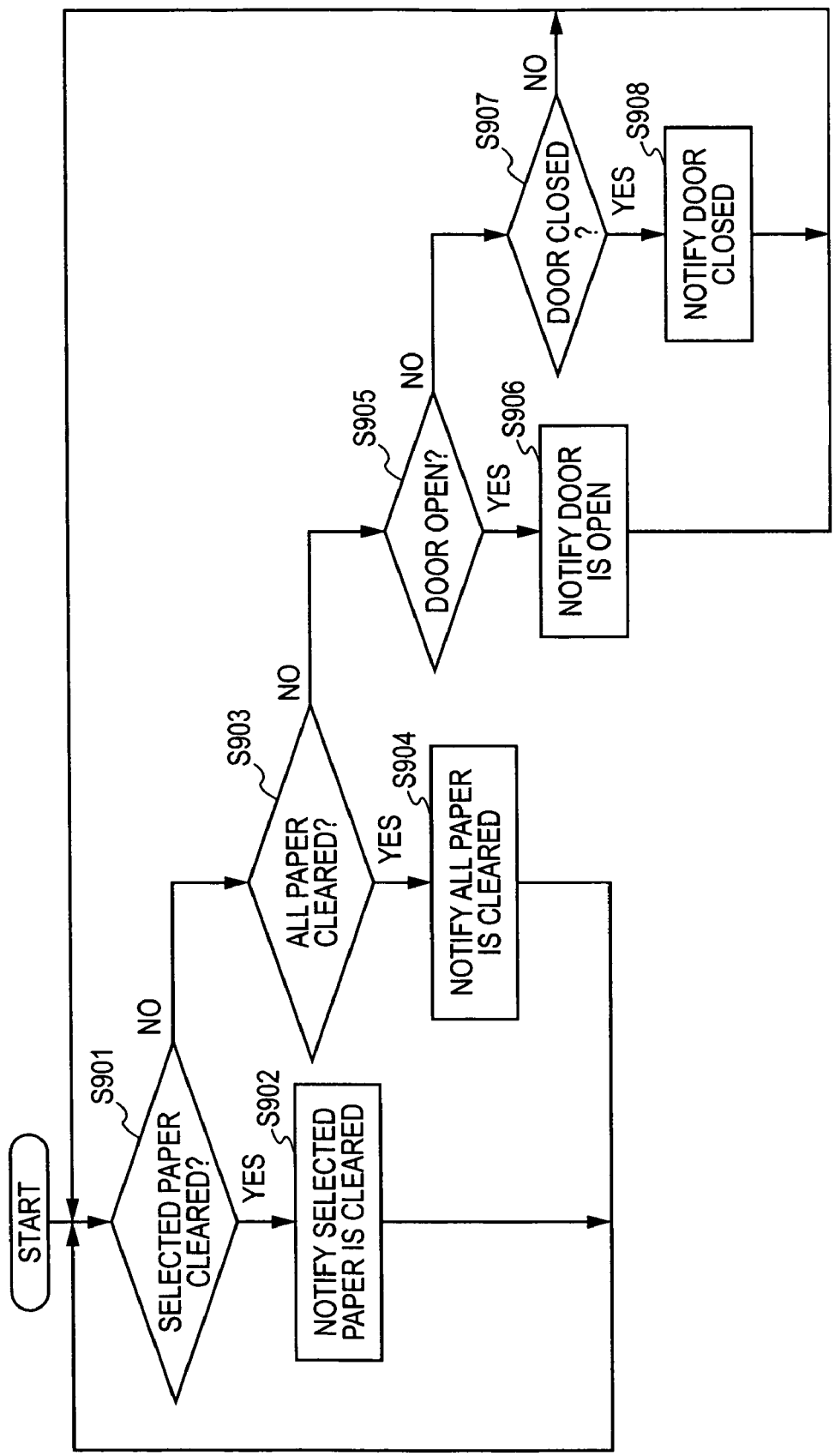
FIG. 14 is a flowchart of an exemplary process flow of the UI unit during paper clearance according to the first exemplary embodiment.

The virtual sensor whose status is changed is a virtual sensor in contact with the sheet of virtual paper having the paper ID specified in step S902 shown in FIG. 14. At this time, if a plurality of virtual sensors is in contact with the selected sheet, the statuses of all the virtual sensors are changed. For example, in the paper-information display screen 702, if a sheet of virtual paper with paper ID number 1 is selected, the value of the virtual sensor with sensor ID number 1 is changed. If a sheet of virtual paper with paper ID number 2 is selected, the values of three virtual sensors, i.e., a virtual sensor with sensor ID number 4, that with sensor ID number 5, and that with sensor ID number 6, are changed.

When step S911 ends, processing then proceeds to step S912 which deletes the selected sheet of virtual paper. The selected sheet of virtual paper in this case is a sheet of virtual paper with paper ID notified in step S902 shown in FIG. 14.

If, in step S910, it is determined that the paper-position calculating unit 20 has not received the notification, processing proceeds to step S913. In step S913, it is determined whether the paper-position calculating unit 20 has received a notification that all sheets of paper are to be cleared. If, in step S913, it is determined that the paper-position calculating unit 20 has received the notification, processing proceeds to step S914, where the values of the virtual sensors corresponding to all sheets of virtual paper are changed. After completion of S914, processing proceeds to step S915, which deletes all virtual paper.

The values of the virtual sensors corresponding to all sheets of virtual paper are composed of, for example, in the screen shown in FIG. 10, the value of a virtual sensor with sensor ID number 1 in contact with a sheet of virtual paper with paper ID number 1 and the values of the virtual sensors with sensor ID numbers 4, 5, and 6 in contact with a sheet of virtual paper with paper ID number 3.

If, in step S913, it is determined that the paper-position calculating unit 20 has not received the notification, processing proceeds to step S916. In step S916, it is determined whether the paper-position calculating unit 20 has received a notification that the door is to be open. If, in step S916, it is determined that the paper-position calculating unit 20 has received the notification, processing proceeds to step S917 where the value of a virtual sensor corresponding to the door is changed to an open status. The term door used herein represents a cover of, for example, a printer. The value of the virtual sensor corresponding to the door indicates whether the cover is open or not. The explanation of the virtual sensor corresponding to the door (cover) is omitted. When the value of the virtual sensor corresponding to the door is changed, this change is fed back to the firm software unit 10 via the output I/F 27 and the input I/F 12. When step S917 ends, processing then returns to step S910.

If, in step S916, it is determined that the paper-position calculating unit 20 has not received the notification that the door is to be open, processing proceeds to step S918. In step S918, it is determined whether the paper-position calculating unit 20 has received a notification that the door is to be closed. If, in step S918, it is determined that the paper-position calculating unit 20 has received the notification, processing proceeds to step S919 where the value of the virtual sensor corresponding to the door is changed to a closing status.

When the value of the virtual sensor corresponding to the door is changed, this change is fed back to the firm software unit 10 via the output I/F 27 and the input I/F 12. When step S919 ends, processing then returns to step S910. Further, if in step S918, it is determined that the paper-position calculation unit 20 has not received the notification that the door is to be closed, processing then returns to step S910.

As described above, according to this exemplary embodiment, a user can delete a sheet of virtual paper freely. Therefore, the user can simulate clearing operation of jammed paper, which would be performed manually by the user after a paper jam in a real machine, and can verify the correct recovery operation.

In addition, according to this exemplary embodiment, performing a feedback process of the opening and closing of a door enables the correct operation of firm software to be verified more accurately. For example, the firm software contains processing performed after determining whether the door is open or closed on the basis of output from a sensor when, for example, a paper jam occurs and changing processing in many cases. A design support apparatus according to this exemplary embodiment can verify the correct processing in the firm software in such a case.

It is further noted that in the aforementioned exemplary embodiment, one feedback process of the opening and closing of the door is used. However, in an alternative embodiment feedback processes of virtual sensors may be individually performed.

[Exemplary Virtual Paper Creation]

Next, virtual paper creation performed by a user is described with reference to FIGS. 16 to 19. In a real machine, when the power is switched off and then switched on while paper remains within the machine, detecting that the paper remains within the machine at power-on is necessary. However, since conventional simulators create virtual paper only by paper feeding, they do not have a situation in which paper is present in a machine by using a method other than paper feeding. Therefore, they cannot verify the correct operation in such a situation. In order to simulate such a situation on a simulator, a design support apparatus according to this exemplary embodiment creates virtual paper at any place by the processing described below.

Figure 16:
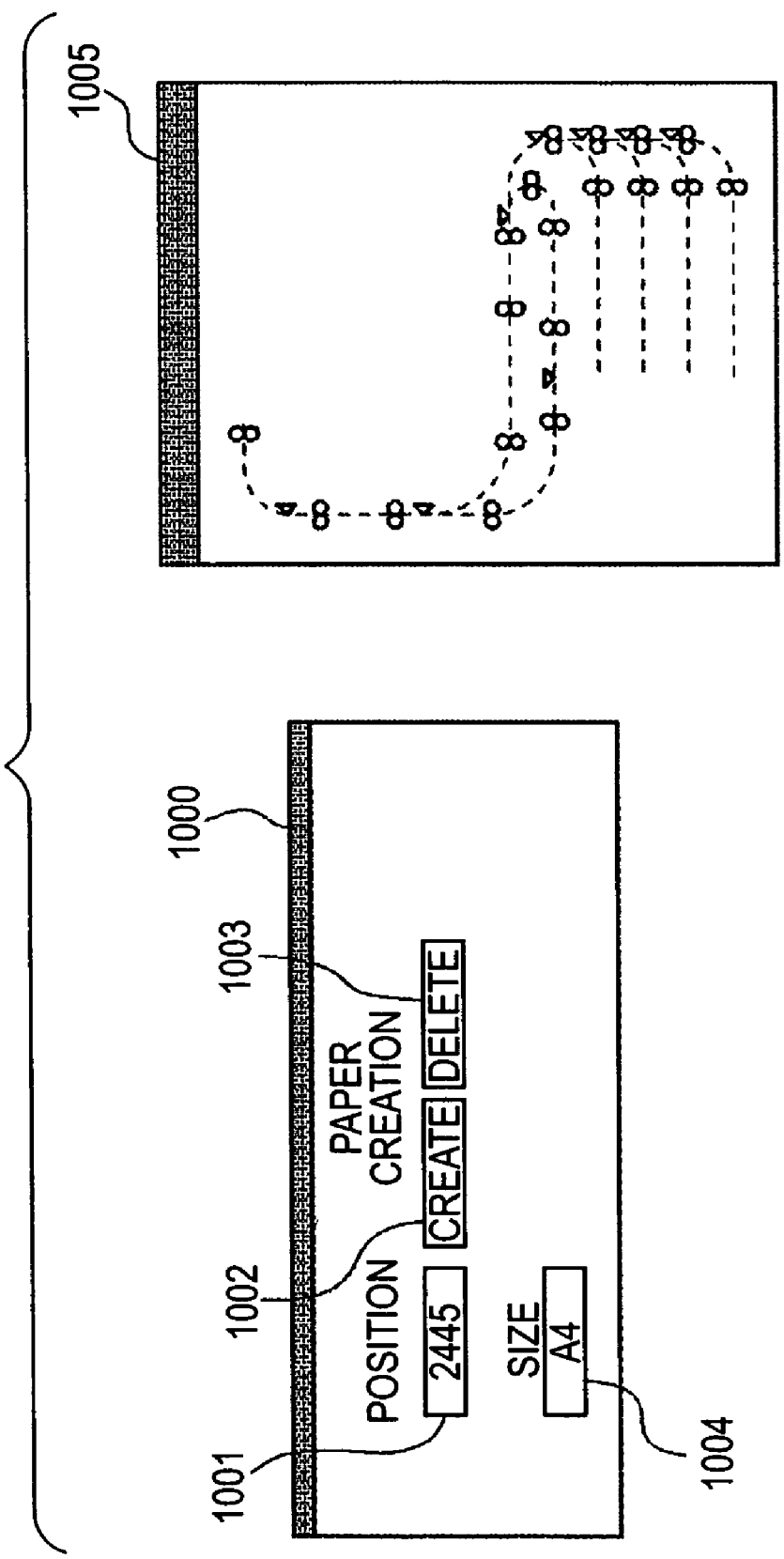
FIG. 16 is an illustration for explaining an exemplary screen for paper creation according to the first exemplary embodiment.

A paper creation setting screen 1000 shown in FIG. 16 appears when paper creation processing is selected from a menu (not shown). A paper-position setting area 1001 is an area in which a user can enter a set value in mm or any other measurement increment. The numerical value set in this area is a distance from a fiducial point.

A paper-size setting area 1004 is an area in which a user can enter the size of a sheet of virtual paper. When a creation button 1002 is pressed, a sheet of virtual paper is created. When a deletion button 1003 is pressed, a sheet of virtual paper created by the pressing of the creation button 1002 is deleted.

Figure 17:
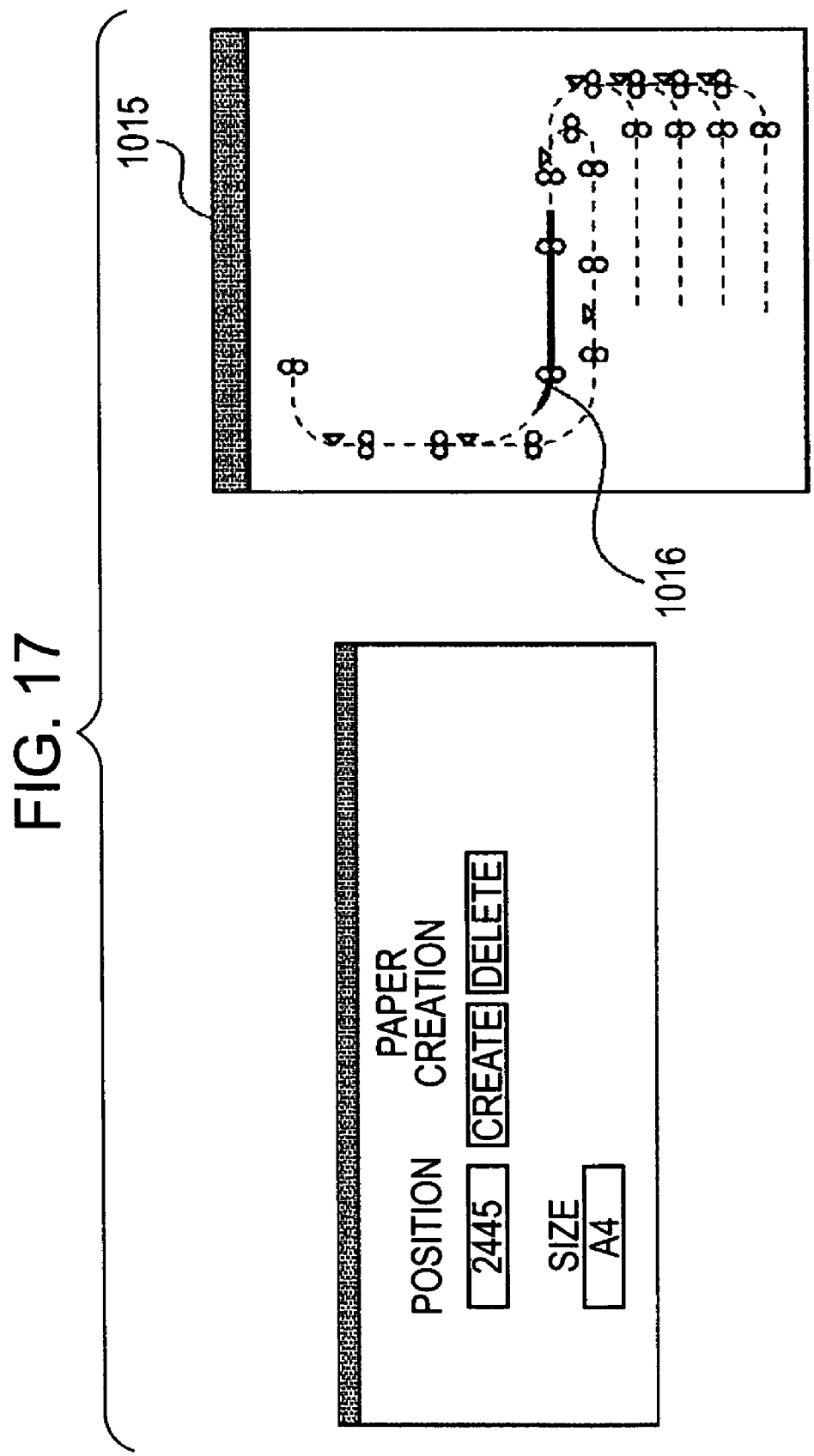
FIG. 17 is an illustration for explaining an exemplary screen for paper creation according to the first exemplary embodiment.

FIG. 17 illustrates a screen that appears after the creation button is pressed in the screen shown in FIG. 16. Compared with a screen 1005 shown in FIG. 16 illustrating that no virtual paper is present, a screen 1015 shown in FIG. 17 illustrates that a sheet of virtual paper 1016 is created. When the deletion button is pressed in the screen shown in FIG. 17, the screen returns to a screen illustrating that no virtual paper is present, as shown in FIG. 16.

Figure 18:
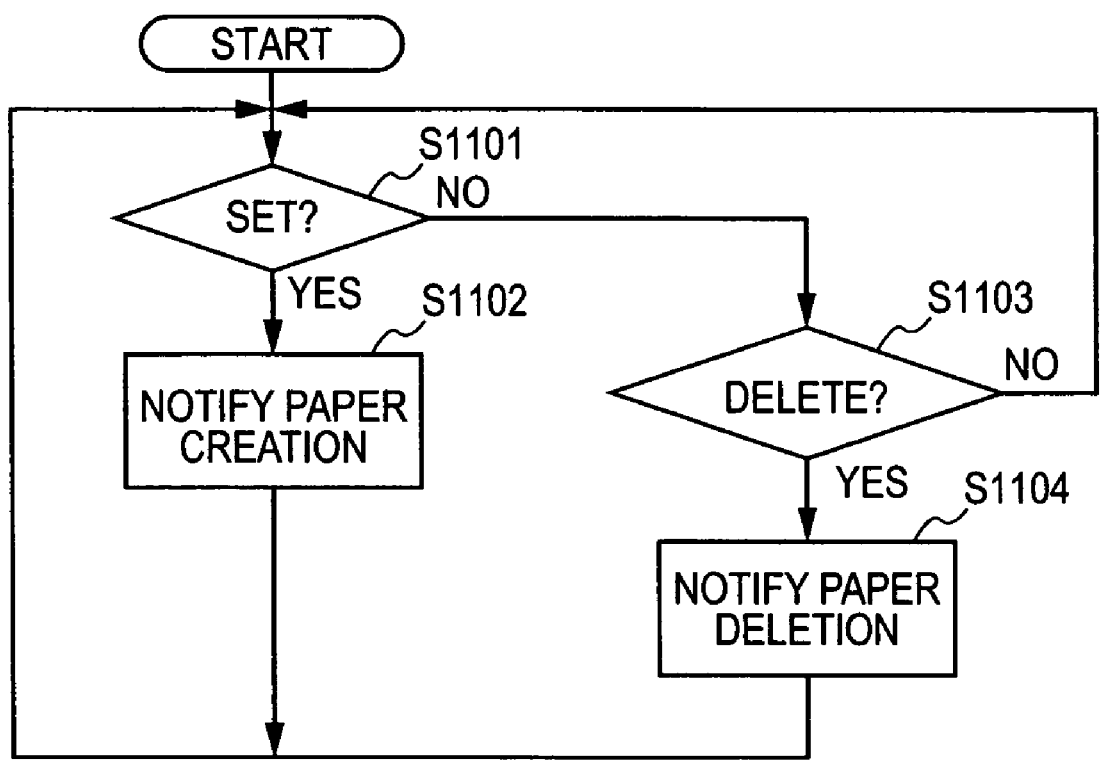
FIG. 18 is a flowchart of an exemplary process flow of the UI unit during paper creation processing according to the first exemplary embodiment.

FIG. 18 is a flowchart of exemplary paper creation processing in the paper-position displaying (UI) unit 28. First, in step S1101, it is determined whether a creation button (the creation button 1002 shown in FIG. 16) has been pressed. If, step S1101, it is determined that the creation button has been pressed, processing proceeds to step S1102. In step S1102, the paper-position displaying (UI) unit 28 notifies the paper-position calculating unit 20 that a sheet of virtual paper is to be created. At this time, together with this notification, position information input in the paper-position setting area 1001 and size information input in the paper-size setting area 1004 are notified. When step S1102 ends, processing then returns to step S1101.

If, in step S1101, it is determined that the creation button has not been pressed, processing proceeds to step S1103. In step S1103, it is determined whether a deletion button (the deletion button 1003 shown in FIG. 16) has been pressed. If, in step S1103, it is determined that the deletion button has been pressed, processing proceeds to step S1104. In step S1104, the paper-position displaying (UI) unit 28 notifies the paper-position calculating unit 20 that a sheet of virtual paper is to be deleted. When step S1104 ends, processing then returns to step S1101. If, in step S1103, it is determined that the deletion button has not been pressed, processing then returns to step S1101.

Figure 19:
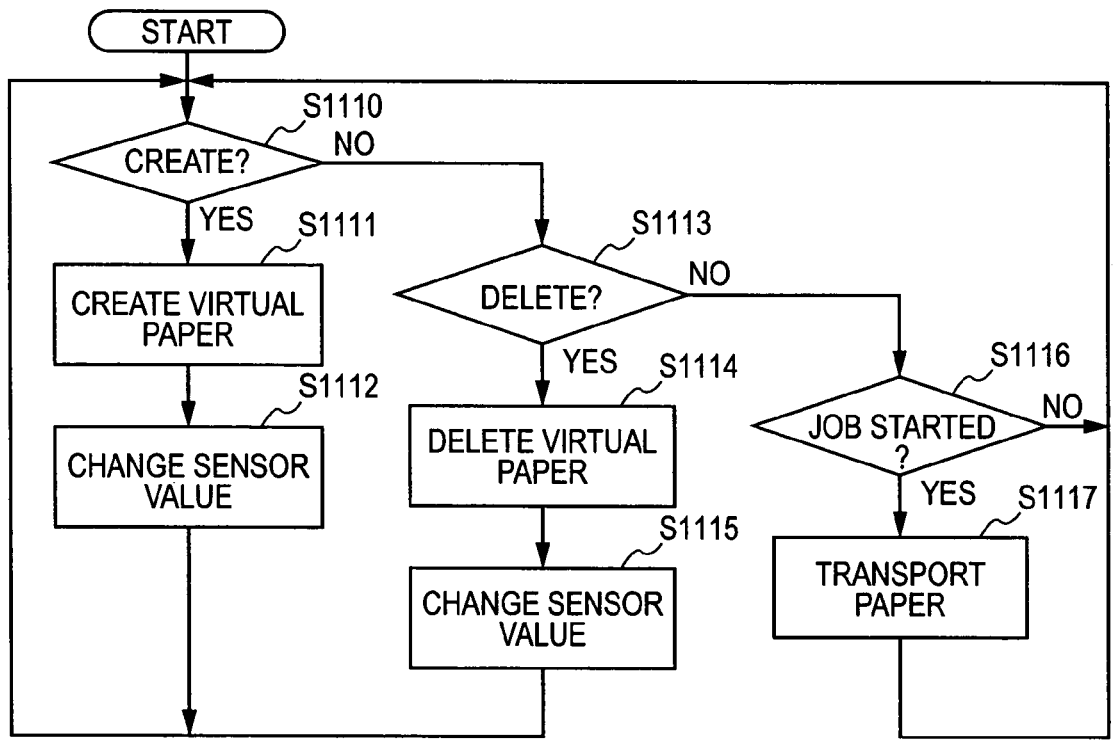
FIG. 19 is a flowchart of the process flow of the paper-position calculating unit during paper creation processing according to the first exemplary embodiment.

Next, a paper creating sequence in the paper-position calculating unit 20 is described with reference to FIG. 19. In step S1110, it is determined whether the paper-position calculating unit 20 has received a notification that a sheet of virtual paper is to be created. If, in step S1110, it is determined that the paper-position calculating unit 20 has received the notification, processing proceeds to step S1111. In step S1111, the sheet of virtual paper is created. In this case, the sheet of virtual paper is created in such a way that the position indicated by the position information sent together with the notification in step S1102 shown in FIG. 18 is set as the leading end and the sheet has a size indicated by the notified size information. When the sheet of virtual paper is created in this way, the sheet of virtual paper is displayed in a simulation screen, as indicated as a sheet of virtual paper 1016 in the screen 1015 shown in FIG. 17.

When step S1111 ends, processing proceeds to step S1112 where the value of a virtual sensor in contact with a portion of the sheet of virtual paper created in step S1111 is changed. If the value of this virtual sensor is changed, the change is fed back to the firm software unit 10 via the output I/F 27 and the input I/F 12. When step S1112 ends, processing proceeds to step S1110.

If, in step S1110, it is determined that the paper-position calculating unit 20 has not received the notification that virtual paper is to be created, processing proceeds to step S1113. In step S1113, it is determined whether the paper-position calculating unit 20 has received a notification that virtual paper is to be deleted.

If, in step S1113, it is determined that the paper-position calculating unit 20 has received the notification the sheet of virtual paper is to be deleted, processing proceeds to step S1114. In step S1114, the created sheet of virtual paper is deleted. In this step, in the case where a sheet of virtual paper has been created in step S1111 using this paper creation function, the sheet of virtual paper is deleted.

When step S1114 ends, processing proceeds to step S1115. In step S1115, in the case where the sheet of virtual paper has been created in step S1111 using this paper creation function, the value of a virtual sensor in contact with the created sheet of virtual paper is changed. This change is fed back to the firm software unit 10 via the output I/F 27 and the input I/F 12. When step S1115 ends, processing proceeds to step S1110.

If, in step S1113, it is determined that the paper-position calculating unit 20 has not received the notification that the sheet of virtual paper is to be deleted, processing proceeds to step S1116. In step S1116, it is determined whether a job has started. If, in step S1116, it is determined that the job has begun, processing proceeds to step S1117. In step S1117, virtual paper is transported. If, in step S1116, it is determined that the job has not begun, processing returns to step S1110.

As described above, according to this exemplary embodiment, a user can create a sheet of virtual paper of any size at any place and perform a simulation. In addition, a user can clear a sheet of virtual paper in a machine and verify the correct processing of firm software after the sheet of virtual paper is cleared. Moreover, a user can create a sheet of virtual paper freely, so that a situation in which virtual paper is present can be simulated at any timing (e.g., at power-on). Therefore, verification of the correct processing of software in such a situation can be realized.

Second Exemplary Embodiment

The basic structure in a second exemplary embodiment is similar to that in the first exemplary embodiment. Therefore, explanation of similar components is omitted. The structure described above up to the jam settings shown in FIG. 9 is similar to the second exemplary embodiment. A difference between the first exemplary embodiment and the second exemplary embodiment is how to clear virtual paper.

Clearing paper at a sensor according to this exemplary embodiment is described with reference to FIGS. 20 to 23. In a real printer, paper may tear while a user is removing it. In this case, the shreds of paper may remain in the printer or only a shred may be removed. Such a situation is simulated by a function of clearing paper at a sensor according to this exemplary embodiment.

Figure 20:
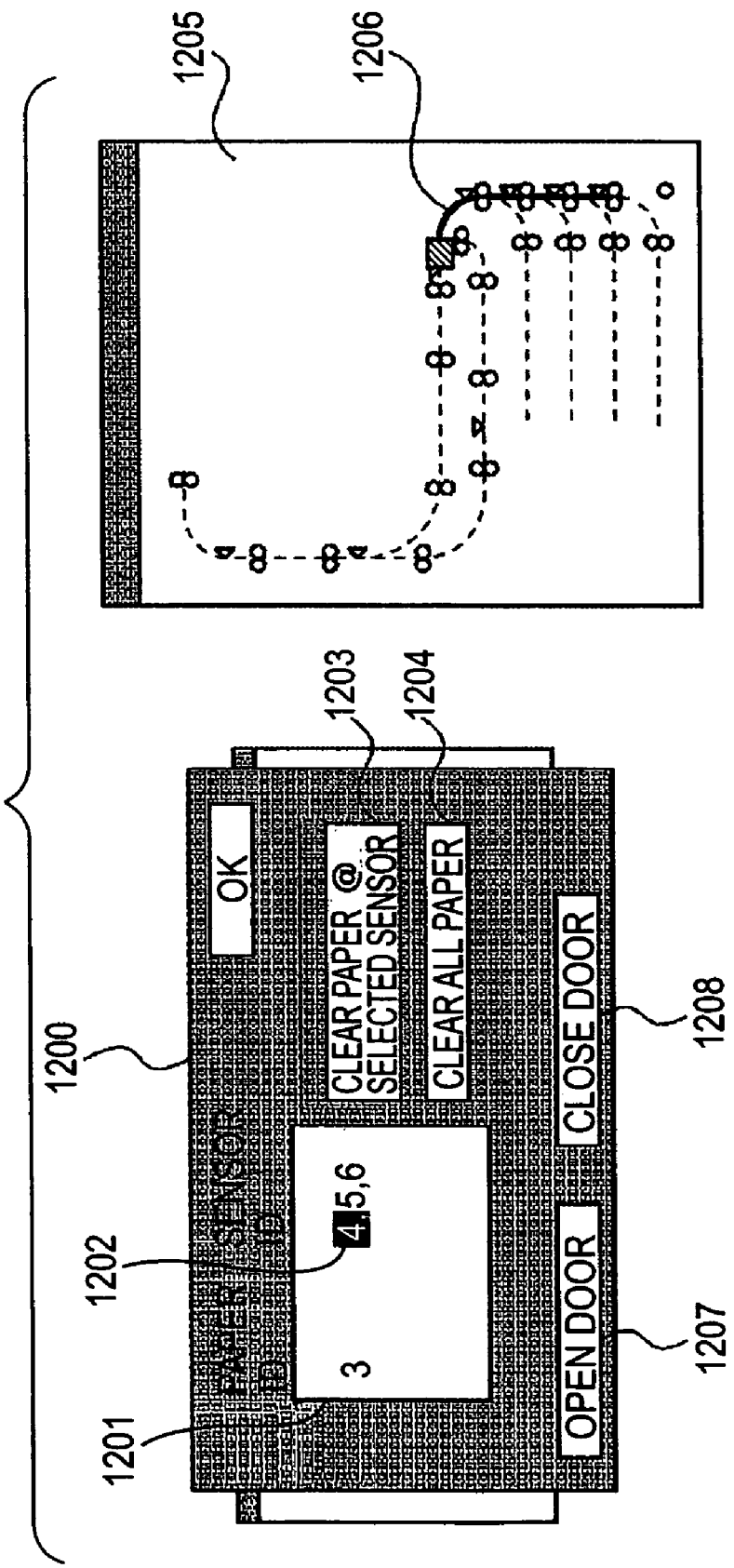
FIG. 20 is an illustration for explaining paper clearance of a section of paper adjacent to a sensor according to a second exemplary embodiment.

FIG. 20 illustrates a screen that appears after the paper removal button 505 on the paper jam setting screen 500 shown in FIG. 5 is pressed, showing that a single sheet of virtual paper is present in a machine. When the paper removal button 505 is pressed, a jam clearance screen 1200 appears.

A paper displaying area 1201 displays information regarding a sheet of virtual paper present in the machine. With respect to the sheet of virtual paper, its paper ID and the sensor ID of a virtual sensor in contact with the sheet of virtual paper. In the paper displaying area 1201, a virtual sensor can be selected from a plurality of virtual sensors. In FIG. 20, as indicated with a reference numeral 1202, sensor ID number 4 is selected while the pixels of the area of the sensor ID number is inverted. A screen 1205 shows a state in the machine. In this case, a single sheet of virtual paper 1206 is displayed on the screen 1205.

When a Clear Paper at Selected Sensor button (hereinafter, referred to as portion clearing button) 1203 is pressed, a portion in contact with a selected virtual sensor (in this embodiment, a virtual sensor 4) in the paper displaying area 1201 is cleared. In this case, the value of this virtual sensor to be fed back to the firm software unit is changed, which is described later.

Figure 21:
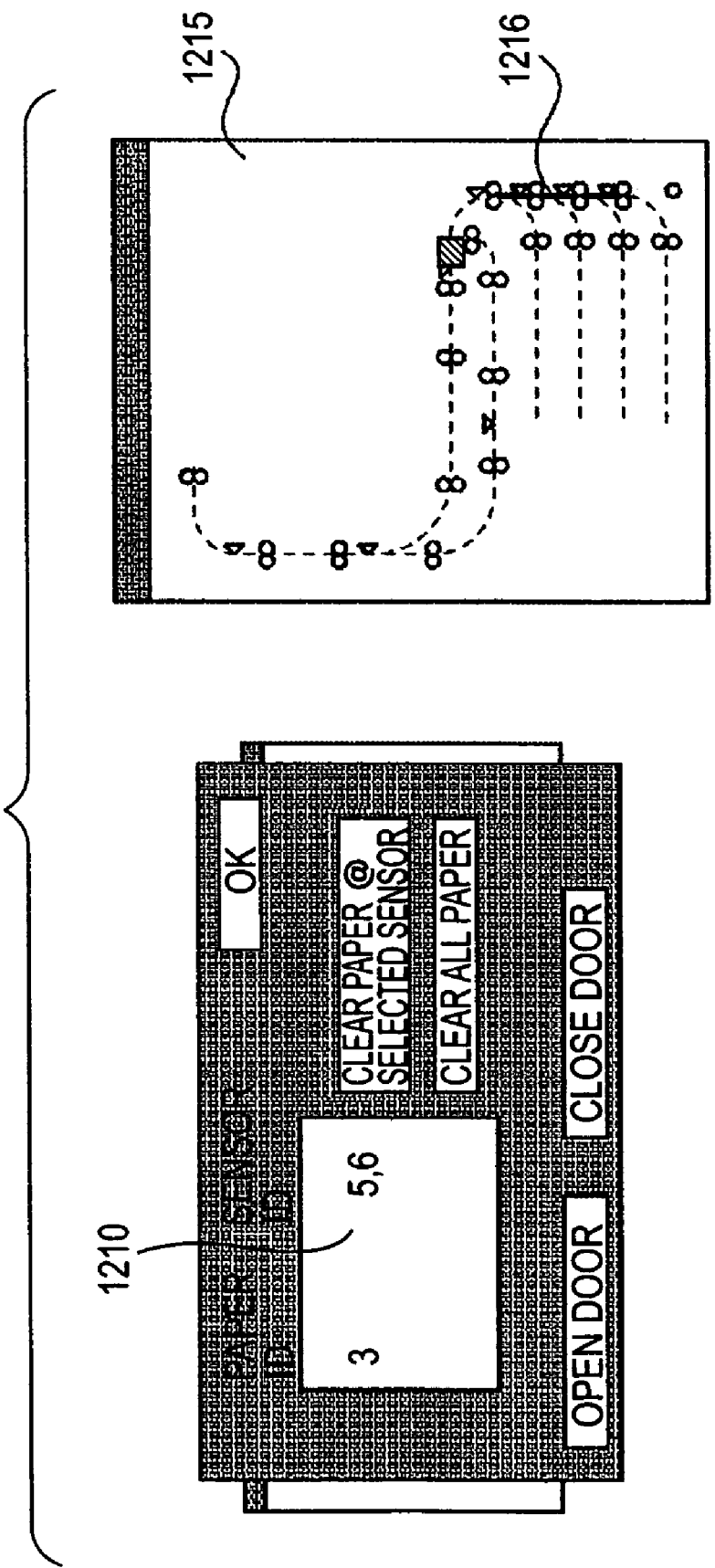
FIG. 21 is an illustration for explaining paper clearance of a section of paper adjacent to a sensor according to a second exemplary embodiment.

When the portion clearing button 1203 is pressed in the screen shown in FIG. 20, the screen is changed to a screen shown in FIG. 21. In FIG. 21, compared with the paper displaying area 1201, the selected sensor ID number 4 is deleted (see reference 1210 indicating the deletion of "4"). This shows that only a portion in contact with the virtual sensor having the sensor ID number 4 has been deleted from the sheet of paper having the paper ID number 3 in the paper displaying area 1201 shown in FIG. 21. As shown in a screen 1215 in FIG. 21, a sheet of virtual paper 1216 present in the machine has become shorter. Compared with the sheet of virtual paper 1206 shown in FIG. 20, a portion corresponding to a single virtual sensor has been cleared.

[Exemplary Virtual-Paper Clearance]

Figure 22:
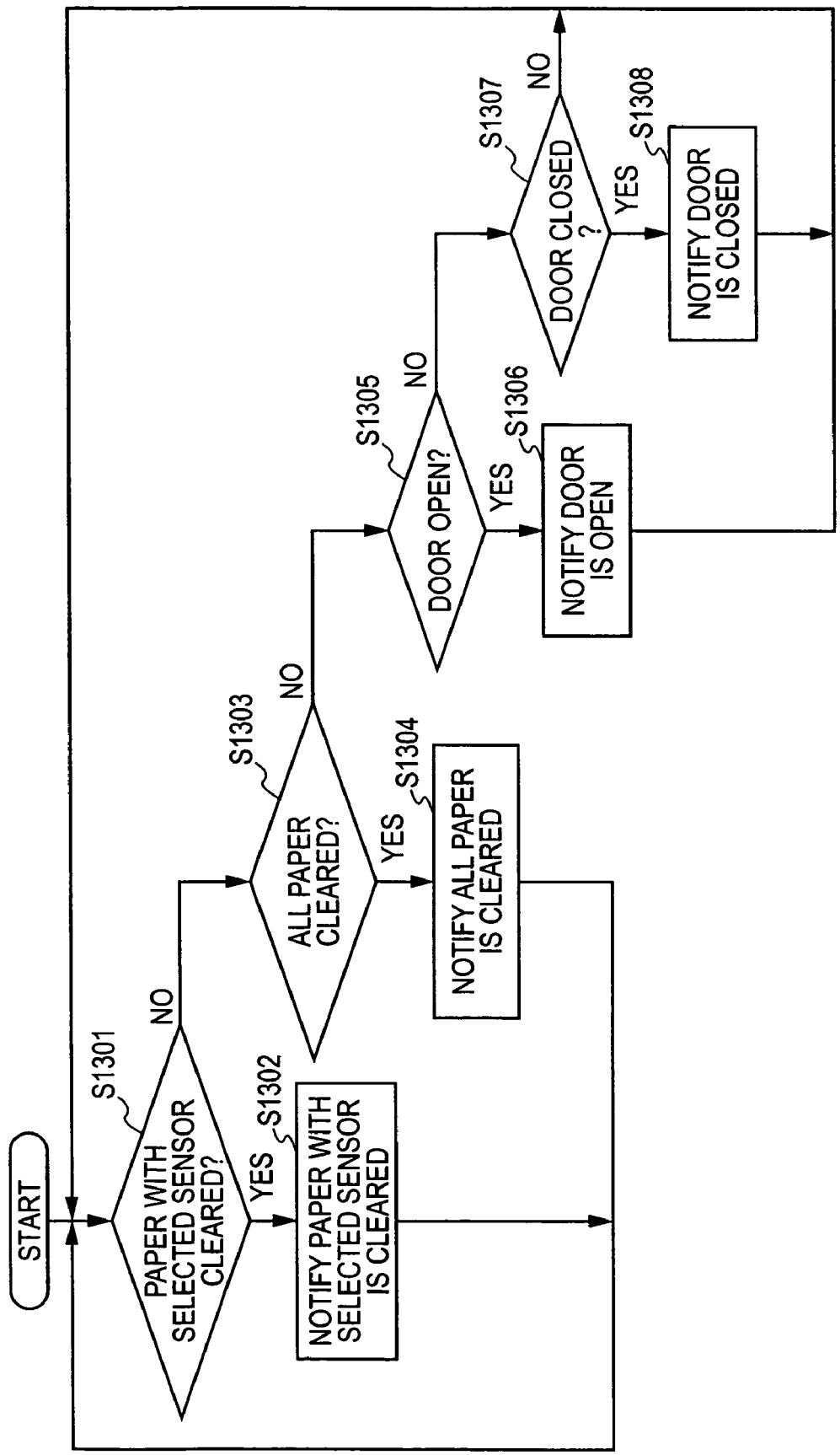
FIG. 22 is a flowchart of an exemplary process flow of the UI unit during paper clearance according to the second exemplary embodiment.
Figure 23:
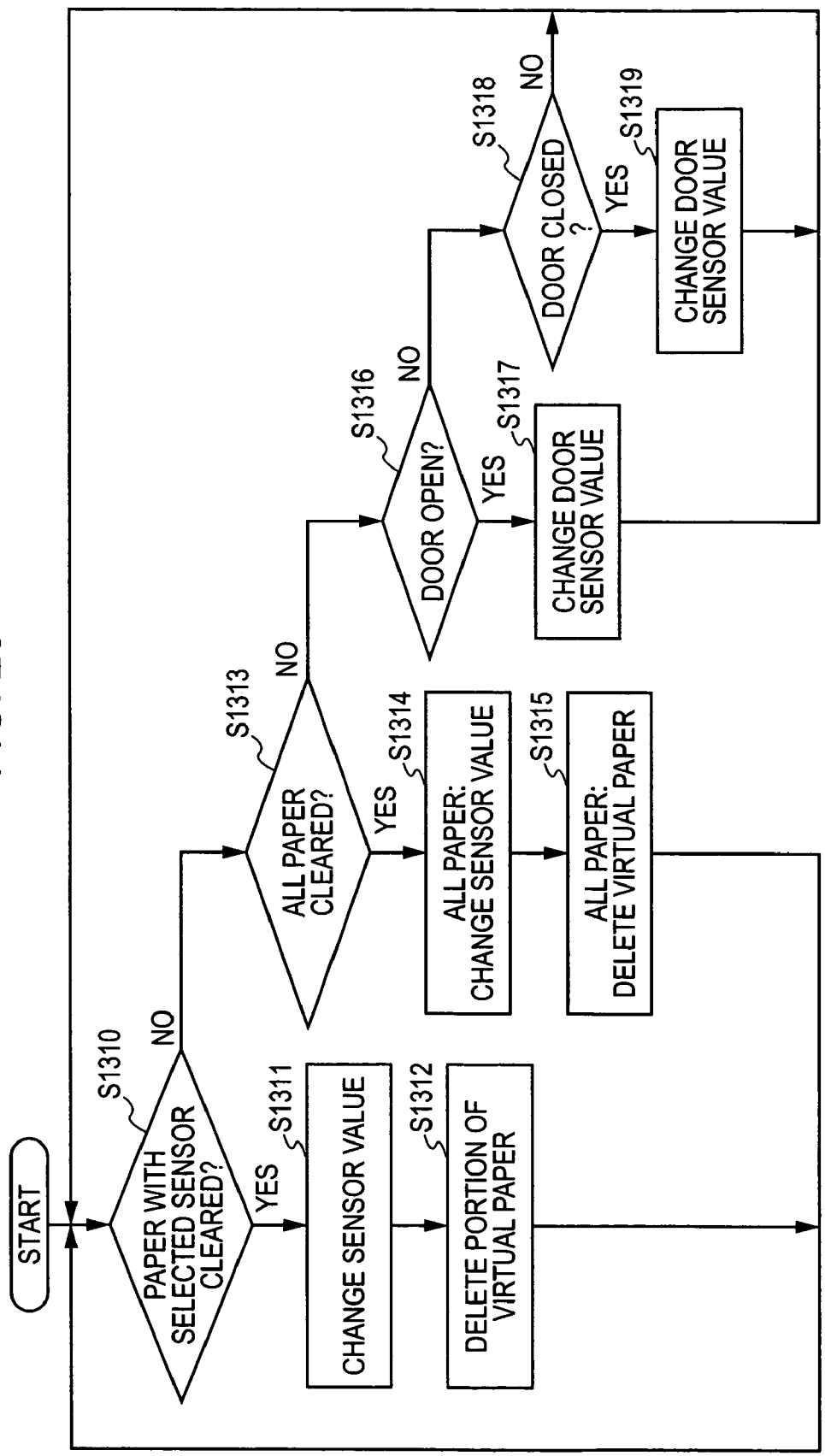
FIG. 23 is a flowchart of an exemplary process flow of the paper-position calculating unit during paper clearance according to the second exemplary embodiment.

Next, a sequence of virtual-paper clearance at a virtual sensor is described with reference to FIGS. 22 and 23. FIG. 22 is a flowchart of paper clearance processing in the paper-position displaying (UI) unit 28.

First, in step S1301, it is determined whether a portion clearing button (the portion clearing button 1203 shown in FIG. 20) has been pressed. If it is determined that the portion clearing button 1203 has been pressed, processing proceeds to step S1302 where the paper-position displaying (UI) unit 28 notifies the paper-position calculating unit 20 that a portion in contact with a selected virtual sensor is to be cleared. At the same time, together with this notification, information indicating what sheet of virtual paper has been selected and what virtual sensor has been selected is notified. The selection of the sheet of virtual paper is realized by specifying the paper ID corresponding to a selected virtual sensor. The selection of the virtual sensor is realized by specifying the sensor ID. When step S1302 ends, processing then returns to step S1301.

If, in step S1301, it is determined that the portion clearing button has not been pressed, processing proceeds to step S1303. In step S1303, it is determined whether an all paper clearing button (all paper clearing button 1204 shown in FIG. 20) has been pressed.

If, in step S1303, it is determined that the all paper clearing button 1204 has been pressed, processing proceeds to step S1304 where the paper-position displaying (UI) unit 28 notifies the paper-position calculating unit 20 that all sheets of virtual paper are to be cleared. When step S1304 ends, processing then returns to step S1301. If in step S1303, it is determined that the all paper clearing button has not been pressed, processing proceeds to step S1305 where it is determined whether a door open button (door open button shown in FIGS. 20 and 21) has been pressed.

If, in step S1305, it is determined that the door open button 1207 has been pressed, processing proceeds to step S1306. In step S1306, the paper-position displaying (UI) unit 28 notifies the paper-position calculating unit 20 that the door is to be open, and processing returns to step S1301.

If, in step S1305, it is determined that the door open button 1207 has not been pressed, processing proceeds to step S1307. In step S1307, it is determined whether a door close button (door close button shown in FIGS. 20 and 21) has been pressed. If, in step S1307, it is determined that the door close button 1208 has been pressed, processing proceeds to step S1308. In step S1308, the paper-position displaying (UI) unit 28 notifies the paper-position calculating unit 20 that the door is to be closed, and processing then returns to step S1301. If, in step S1307, it is determined that the door close button 1208 has not been pressed, processing returns to step S1301.

[Exemplary Processing Related to Virtual Paper Clearance]

Next, exemplary processing relating to virtual-paper clearance at a virtual sensor in the paper-position calculating unit 20 is described with reference to FIG. 23. This processing is carried out in parallel with paper transport processing.

In step S1310, it is determined whether the paper-position calculating unit 20 has received from the paper-position displaying (UI) unit 28 a notification that a portion of virtual paper in contact with a selected sensor is to be cleared. If, in step S1310, it is determined that the paper-position calculating unit 20 has received the notification, processing proceeds to step S1311 where the value of the selected virtual sensor corresponding to the selected sheet is changed. When the value is changed, the change is fed back to the firm software unit 10 via the output I/F 27 and the input I/F 12. The virtual sensor whose value is changed is a virtual sensor that has the sensor ID specified in step S1302 shown in FIG. 22. At this time, if a plurality of virtual sensors are selected, the values of all the virtual sensors are changed.

When step S1311 ends, processing then proceeds to step S1312 which deletes a portion of the sheet of virtual paper corresponding to the selected virtual sensor. In this case, the portion of the sheet corresponding to the virtual sensor is a portion that is contained in the sheet whose paper ID is notified in step S1302 shown in FIG. 22 and that is in contact with the notified virtual sensor.

If, in step S1310, it is determined that the paper-position calculating unit 20 has not received the notification, processing proceeds to step S1313. In step S1313, it is determined whether the paper-position calculating unit 20 has received a notification that all sheets of paper are to be cleared. If, in step S1313, it is determined that the paper-position calculating unit 20 has received the notification, processing proceeds to step S1314 where the values of the virtual sensors corresponding to all sheets of virtual paper are changed. When step S1314 ends, processing then proceeds to step S1315 which deletes all sheets of virtual paper. When step S1315 ends, processing then returns to step S1310.

If in step S1313 it is determined that the paper-position calculating unit 20 has not received the notification, processing proceeds to step S1316 where it is determined whether the paper-position calculating unit 20 has received a notification that the door is to be open. If in step S1316 it is determined that the paper-position calculating unit 20 has received the notification, processing proceeds to step S1317.

In step S1317, the value of a virtual sensor corresponding to the door is changed to an open status. The term door used herein represents a cover of, for example, a printer. However, the term door may also represent other features of an apparatus such as a hatch or the like if so desired. The value of the virtual sensor corresponding to the door indicates whether the cover is open or not. When the value of the virtual sensor corresponding to the door is changed, this change is fed back to the firm software unit 10 via the output I/F 27 and the input I/F 12. When step S1317 ends, processing then returns to step S1310.

If, in step S1316, it is determined that the paper-position calculating unit 20 has not received the notification that the door is to be open, processing proceeds to step S1318. In step S1318, it is determined whether the paper-position calculating unit 20 has received a notification that the door is to be closed. If, in step S1318, it is determined that the paper-position calculating unit 20 has received the notification, processing proceeds to step S1319 where the value of the virtual sensor corresponding to the door is changed to a closing status.

When the value of the virtual sensor corresponding to the door is changed, this change is fed back to the firm software unit 10 via the output I/F 27 and the input I/F 12. When step S1319 ends, processing then returns to step S1310. If, in step S1318, it is determined that the paper-position calculating unit 20 has not received the notification, processing returns to step S1310.

As described above, according to this exemplary embodiment, when a plurality of virtual sensors senses a jammed sheet of virtual paper, a user can clear the status that senses the sheet of virtual paper with respect to a virtual sensor selected from the plurality of virtual sensors and delete a portion of the sheet of virtual paper freely. Therefore, a situation in which a sheet of paper tears while the user is manually removing it in a real printer can be simulated. As a result, the correct processing in such a situation is verified.

Other Exemplary Embodiments

In addition, according to this exemplary embodiment, performing a feedback process of the opening and closing of a door enables the correct operation of firm software to be verified more accurately. Firmware serving to control a paper transport contains processing performed after determining whether the door is open or closed when a paper jam occurs and changing processing in many cases. A design support apparatus according to this exemplary embodiment can verify the correct processing in such a situation in the firmware.

In this exemplary embodiment, one feedback process of the opening and closing of the door is used. However, feedback processes of virtual sensors may be individually performed.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-361483 filed Dec. 14, 2004, which is hereby incorporated by reference herein in its entirety.

What is claimed is:

1. A computer-readable medium containing computer-executable instructions for performing a design support program capable of verifying correct processing operation of software for controlling a paper transport mechanism, the medium comprising:
   computer-executable instructions for a displaying step of displaying a simulation screen relating to transport of virtual paper on a display unit of a computer;
   computer-executable instructions for a jam setting step of presetting a condition for causing a paper jam with respect to the virtual paper;
   computer-executable instructions for a jam causing step of causing the paper jam in accordance with the condition preset in the jam setting step;
   computer-executable instructions for a selecting step of, when the paper jam is caused by the jam causing step, selecting a sheet of virtual paper, the sheet being subjected to the paper jam, by an instruction from a user
   computer-executable instructions for a deleting step of deleting the sheet of virtual paper selected by the selecting step from the simulation screen; and
   computer-executable instructions for a changing step of, when the sheet of virtual paper is selected in the selecting step, changing a virtual sensor that senses the selected sheet of virtual paper to a status of sensing no virtual paper.

2. The computer-readable medium according to claim 1, wherein the selecting step is capable of selecting any sheet to be deleted of virtual paper or all sheets to be deleted of virtual paper by the user.

3. The computer-readable medium according to claim 1, wherein the condition for causing a paper jam preset in the jam setting step includes information regarding a place where the paper jam is to be caused and information regarding the number of sheets of virtual paper allowed to be counted before the paper jam is caused.

4. A computer-readable medium containing computer-executable instructions for performing a design support program capable of verifying correct processing operation of software for controlling a paper transport mechanism, the medium comprising:
   computer-executable instructions for a displaying step of displaying a simulation screen relating to transport of virtual paper on a display unit of a computer;
   computer-executable instructions for an inputting step of inputting any place on the simulation screen by an instruction from a user;
   computer-executable instructions for a creating step of creating a sheet of virtual paper at the place input in the inputting step on the simulation screen; and
   computer-executable instructions for a changing step of, when the sheet of virtual paper is created in the creating step, changing a virtual sensor that senses the created sheet of virtual paper to a status of sensing no virtual paper.

5. The computer-readable medium according to claim 4, wherein the inputting step is capable of inputting a size of a sheet of virtual paper.

6. A computer-readable medium containing computer-executable instructions for performing a design support program capable of verifying correct processing operation of software for controlling a paper transport mechanism, the medium comprising:
   computer-executable instructions for a displaying step of displaying a simulation screen relating to transport of virtual paper on a display unit of a computer;
   computer-executable instructions for a jam setting step of presetting a condition for causing a paper jam with respect to the virtual paper;
   computer-executable instructions for a jam causing step of causing the paper jam in accordance with the condition preset in the jam setting step;
   computer-executable instructions for a selecting step of, when the paper jam is caused by the jam causing step, selecting a sheet of virtual paper, the sheet being subjected to the paper jam, by an instruction from a user; and
   computer-executable instructions for a deleting step of deleting from the simulation screen a portion of the sheet, the portion being sensed by the virtual sensor selected in the selecting step.

7. The computer-readable medium according to claim 6, wherein, in the selecting step, when the sheet of virtual paper is sensed by a plurality of virtual sensors, any one virtual sensor is selectable from the plurality of virtual sensors.

8. The computer-readable medium according to claim 6, further comprising:
   computer-executable instructions for a changing step of, when the virtual sensor is selected in the selecting step, changing the virtual sensor that senses virtual paper to a status of sensing no virtual paper.

9. A design support method capable of verifying correct processing operation of software for controlling a paper transport mechanism by using a computer, the method comprising:
   a displaying step of displaying a simulation screen relating to transport of virtual paper on a display unit of the computer;
   a jam setting step of presetting a condition for causing a paper jam with respect to the virtual paper;
   a jam causing step of causing the paper jam in accordance with the condition preset in the jam setting step;
   a selecting step of, when the paper jam is caused by the jam causing step, selecting a sheet of virtual paper, the sheet being subjected to the paper jam, by an instruction from a user;
   a deleting step of deleting the sheet of virtual paper selected by the selecting step from the simulation screen; and
   computer-executable instructions for a changing step of, when the sheet of virtual paper is selected in the selecting step, changing a virtual sensor that senses the selected sheet of virtual paper to a status of sensing no virtual paper.

10. A design support method capable of verifying correct processing operation of software for controlling a paper transport mechanism by using a computer, the method comprising:

a displaying step of displaying a simulation screen relating to transport of virtual paper on a display unit of the computer;

an inputting step of inputting any place on the simulation screen by an instruction from a user;

a creating step of creating a sheet of virtual paper at the place input in the inputting step on the simulation screen; and a changing step of, when the sheet of virtual paper is created in the creating step, changing a virtual sensor that senses the created sheet of virtual paper to a status of sensing no virtual paper.

11. A design support method capable of verifying correct processing operation of software for controlling a paper transport mechanism by using a computer, the method comprising:

a displaying step of displaying a simulation screen relating to transport of virtual paper on a display unit of the computer;

a jam setting step of presetting a condition for causing a paper jam with respect to the virtual paper;

a jam causing step of causing the paper jam in accordance with the condition preset in the jam setting step;

a selecting step of, when the paper jam is caused by the jam causing step, selecting a sheet of virtual paper, the sheet being subjected to the paper jam, by an instruction from a user; and a deleting step of deleting from the simulation screen a portion of the sheet, the portion being sensed by the virtual sensor selected in the selecting step.

* * * * *